United States Patent [19]
Naito

[11] Patent Number: 4,722,406
[45] Date of Patent: Feb. 2, 1988

[54] ELECTRONIC WEIGHER WITH COMPENSATED TEST SIGNAL

[75] Inventor: Kazufumi Naito, Ohtsu, Japan

[73] Assignee: Ishida Scales Mfg. Co. Ltd., Kyoto, Japan

[21] Appl. No.: 847,777

[22] Filed: Apr. 3, 1986

Related U.S. Application Data

[63] Continuation-in-part of Ser. No. 677,470, Dec. 3, 1984.

[30] Foreign Application Priority Data

Jun. 21, 1985 [JP] Japan ............... 60-135439

[51] Int. Cl.[4] ............... G01G 19/52; G01G 3/14
[52] U.S. Cl. ............... 177/50; 177/211; 73/1 B; 73/862.67
[58] Field of Search ............... 177/211, 1, 50; 73/1 B, 73/862.67; 364/567

[56] References Cited

U.S. PATENT DOCUMENTS 4,475,608 10/1984 Naito ............... 177/211
4,535,854 8/1985 Gard et al. ............... 177/1

FOREIGN PATENT DOCUMENTS 1471905 4/1977 United Kingdom .

*Primary Examiner*—E. A. Goldberg
*Assistant Examiner*—Patrick W. Foster
*Attorney, Agent, or Firm*—Staas & Halsey

[57] ABSTRACT

An electronic weigher includes a load cell for producing as an output an electric signal proportional to a load, an operational amplifier for amplifying the electric signal produced by the load cell, A/D converter for converting an output signal produced by the operational amplifier into a digital signal, a bias circuit for delivering a dummy signal for test purposes to the operational amplifier, and a switch disposed between the bias circuit and the proportional amplifier for applying the dumy signal to the operational amplifier, wherein amplification circuitry from the operational amplifier to the A/D converter is diagnosed by operating the switch.

10 Claims, 24 Drawing Figures

ELECTRONIC WEIGHER WITH COMPENSATED TEST SIGNAL

This is a continuation-in-part application of copending U.S. application Ser. No. 677,470, filed on Dec. 3, 1984, entitled ELECTRONIC WEIGHER and assigned to the assignee of the present application.

BACKGROUND OF THE INVENTION

This invention relates to an electronic weigher such as a counting scale, weighing scale or fee scale. More particularly, the invention relates to an electronic weigher adapted so as to be able to sense a problem in amplification circuitry extending from the input side of an operational amplifier for amplifying a weight signal to the output side of an A/D converter.

An electronic weigher is susceptible to a variety of troubles. Since a failure which may develop in the amplifier circuitry of such a weigher cannot be ascertained externally of the weigher, there is the danger that a weighing error outside allowable limits may occur without being noticed, thereby resulting in use of an erronous reading. For this reason, the prior-art practice is to load the weigher with a test weight from time to time and then examine the weight reading to determine if the weigher is operating normally. However, it is very troublesome for the user to examine the weigher every day by application of the test weight. Hence there is need of an improvement in this area.

SUMMARY OF THE INVENTION

An object of the present invention is to provide an electronic weigher in which a failure in amplification circuitry can be sensed in simple fashion by operating a switch or key, without applying a test weight.

Another object of the present invention is to provide an electronic weigher which is capable of automatically diagnosing a failure in amplification circuitry with high accuracy by removing a drift caused by temperature change.

Still another object of the present invention is to provide an electronic weigher in which a failure in amplification circuitry can be diagnosed automatically when the weigher is an unloaded state.

A further object of the present invention is to provide an electronic weigher adapted to warn an operator when amplification circuitry develops a malfunction.

A still further object of the present invention is to provide an electronic weigher which ceases functioning when amplification circuitry develops a malfunction.

According to a first embodiment of the present invention, there is provided an electronic weigher having a load cell for producing as an output an electric signal proportional to a load, an operational amplifier for amplifying the electric signal produced by the load cell, an A/D converter for converting an output signal produced by the operational amplifier into a digital signal, a bias circuit for delivering a dummy signal for test purposes to the operational amplifier, and a switch disposed between the bias circuit and the operational amplifier for applying the dummy signal to the operational amplifier. By operating the switch, the operator is capable of diagnosing the amplification circuitry, which extends from the operational amplifier to the A/D converter, by reading a value displayed on a display unit.

According to a second embodiment of the present invention, the electronic weigher of the first embodiment is additionally provided with control means for controlling the switch, sensing means for sensing a malfunction in the amplification circuitry extending from the operational amplifier to the A/D converter on the basis of an output value from the A/D converter when the switch is closed, and malfunction indicating means actuated when the sensing means senses a malfunction in the amplification circuitry. In the electronic weigher according to the second embodiment of the invention, the diagnosis of the amplification circuitry can be performed automatically by the weigher itself and a malfunction indication given. This arrangement completely frees the operator of the task of diagnosing the amplification circuitry.

According to a third embodiment of the present invention, the electronic weigher of the second embodiment is additionally provided with a command switch for commanding operation of the control means. The amplification circuitry can therefore be diagnosed when the command switch is operated by the operator of his own volition.

According to a fourth embodiment of the present invention, the electronic weigher of the second embodiment is additionally provided with safety means for suspending the functioning of the weigher when the sensing means senses a malfunction in the amplification circuitry. According to a fifth embodiment of the present invention, the electronic weigher of the third embodiment is additionally provided with safety means for suspending the functioning of the weigher when the sensing means senses a malfunction in the amplification circuitry. According to the fourth and fifth embodiments of the present invention, the functioning of the weigher is halted completely when a malfunction in the amplification circuitry is sensed, thereby preventing contingencies caused by erroreous weigher operation.

According to a fifth embodiment of the present invention, an electronic weigher is provided with a load cell for producing an electric signal proportional to a load, a drift amount sensing circuit for sensing the amount of drift of the voltage at the output terminal of the load cell, an operational amplifier for amplifying the electric signal produced by the load cell, and a switch for switching a circuitry of the electronic weigher to a self-diagnosis mode and a weighing mode. The electronic weigher is further provided with correction means for producing a constant voltage which is not affected by the output voltage from the load cell in accordance with the amount of drift sensed by the drift amount sensing circuit when the circuitry of the elctronic weigher is switched to the self-diagnosis mode, and with an operational amplifier for adding the electric signal produced by the load cell and the electric signal produced by the correction means.

Other features and advantages of the present invention will be apparent from the following description taken in conjunction with the accompanying drawings.

DESCRIPTION OF THE PREFERRED EMBODIMENTS

Figure 1:
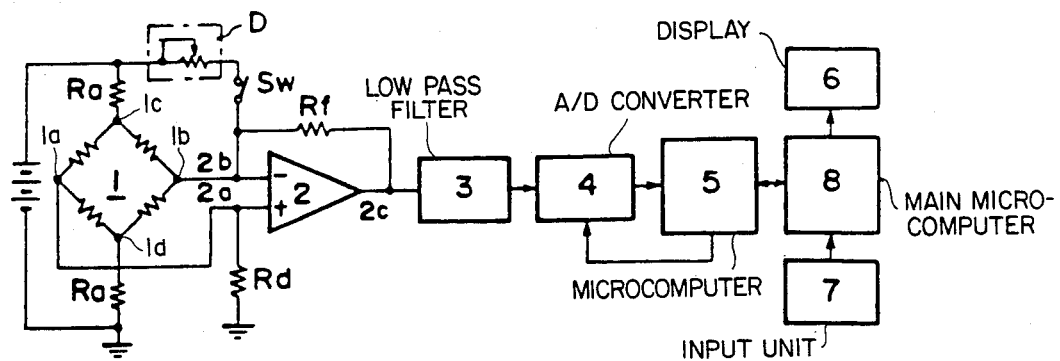
FIG. 1 is a block diagram illustrating, in simplified form, the construction of a first embodiment of an electronic weigher according to the present invention.

FIG. 1 is a block diagram illustrating a first embodiment of an electronic weigher according to the present invention. A bridge circuit 1 of a load cell for producing an electric signal proportional to a load has output terminals 1a and 1b connected respectively to positive and negative input terminals 2a, 2b of an operational amplifier 2. Connected across the negative input terminal 2b and a positive output terminal 2c of the operational amplifier 2 is a feedback resistor Rf. Connected between the positive input terminal 2a of the operational amplifier 2 and ground is a voltage dividing resistor Rd having the same resistance value as the feedback resistor Rf. The operational amplifier 2 and bridge circuit 1 construct a differential amplifier circuit. This circuit arrangement is disclosed in U.S. Pat. No. 4,475,608, which is hereby incorporated by reference.

Resistors Ra are connected to the bridge circuit 1 for temperature compensating purposes. A bias circuit D comprising, for example, a variable resistor, is for producing a dummy signal for test purposes. The bias circuit D has an input terminal connected to a voltage input terminal 1c of the load cell, and an output terminal connected via a switch Sw to the negative input terminal 2b of the operational amplifier 2. The operational amplifier 2 thus connected to the bias circuit D via the switch Sw and negative input terminal 2b functions an adder when the switch Sw is closed. More specifically, when the switch Sw is in the closed state, an output current from the bridge 1 and an output current (dummy signal) from the bias circuit D flow into the feedback circuit Rf and are added. In the present embodiment, the switch Sw is one which can be opened and closed manually to permit the operator to diagnose the amplification circuitry.

The output side of the operational amplifier 2 is connected via a flicker preventing low-pass filter circuit 3 to an A/D converter 4 which converts an analog signal into a digital signal. While various arrangements may serve as the A/D converter 4, in the present embodiment use is made of double-integrating type device in which the integrating time of the analog signal is controlled by a software timer set in a microcomputer 5. A double-integrating A/D converter of this kind is disclosed in the specification of application Ser. No. 580,690, corresponding to Japanese Patent Application No. 58-25149 and assigned to the Assignee of the present application.

Numeral 6 denotes a display unit for displaying weight (number), unit price, total price and the like, 7 an input unit having numeric keys and a variety of function keys, and 8 a main microcomputer (hereafter referred to as a main computer) for centralized control of the microcomputer 5, display unit 6 and input unit 7.

The operation of the present embodiment, including a diagnostic operation, will now be described.

First, to decide the output value (dummy signal) of the bias circuit D, the operator closes the switch Sw while the weigher is in an unloaded state and then, under these conditions, adjusts the variable resistor of the bias circuit D in such a manner that the value displayed by the weigher takes on a predetermined weight value, e.g., a weight value corresponding to the weighing capacity of the weigher. Since the operational amplifier 2 functions as an adder when the switch Sw is in the closed state, an output current from the bridge 1 corresponding to an initial load (the weight of the weighing dish), and an output current from the bias circuit D, flow into the feedback resistor Rf and, hence, are added. However, since the initial weight is understood to be zero based on the ordinary function of the weigher, solely the dummy signal is converted into a weight value and displayed when the weigher is free of an applied load. Accordingly, adjustment of the variable resistor is completed by causing the predetermined weight to be displayed on the display unit 6. When the above adjustment is completed, the operator then opens the switch Sw to place the weigher in the ordinary weighing mode. In the weighing mode, the operational amplifier 2 functions as a simple differential amplifier, and the bias circuit D and operational amplifier 2 are completely isolated from each other in electrical terms. In the weighing mode, therefore, the bias circuit D has absolutely no effect upon the amplification circuitry.

To diagnose a failure in the amplification circuitry, the operator unloads the weigher and closes the switch Sw. Under such conditions, a current corresponding to the previously adjusted predetermined weight flows from the bias circuit D into the operational amplifier 2. Accordingly, if the reading displayed on the display unit 6 is the predetermined weight, the amplification circuitry is normal; if not, then this indicates that the weigher has developed a failure.

A failure anywhere in the amplification circuitry from the operational amplifier to the A/D converter can thus be detected. If the amplification circuitry is mounted on a single circuit board, the circuitry may be replaced easily when a failure occurs.

Figure 2:
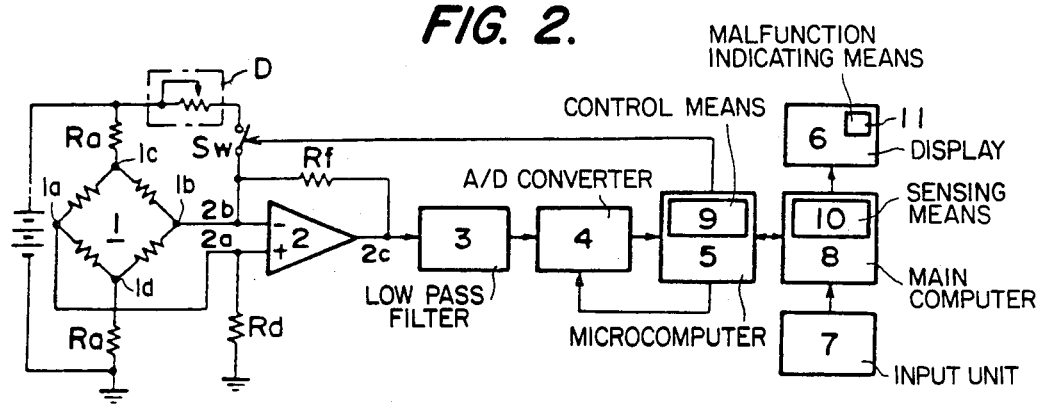
FIG. 2 is a block diagram illustrating, in simplified form, the construction of a second embodiment of an electronic weigher according to the present invention.

FIG. 2 illustrates a second embodiment of an electronic weigher according to the present invention. Portions identical with those shown in FIG. 1 are designated by like reference characters and need not be described again. In the second embodiment of the invention, the microcomputer 5 is provided with control means 9 for controlling the switch Sw to automate the opening and closing action of the switch. In addition, the main computer 8 is provided with sensing means 10 for sensing a malfunction in the amplification circuitry, thereby automating the diagnosis of this circuitry. The display unit 6 is provided with malfunction indicating means 11 operative when the result of the sensing operation is abnormal, thereby notify the operator of the situation.

The control means 9 is adapted so as to operate on the basis of a command from the main computer 8. The sensing means 10 is adapted so as to sense a malfunction in the amplification circuitry from the operational amplifier 2 to the A/D converter 4 based on the output value of the A/D converter 4 when the switch Sw is closed. A suitable arrangement such as an alarm or a blinking lamp can be used as the malfunction indicating means. For example, software can be used to blank out a weight reading display section of the display unit 6 or to cause the display unit 6 to present an error display.

The control means 9 and sensing means 10 can be incorporated in one of the microcomputers or, as shown in FIG. 2, they can be apportioned to the microcomputers 5, 8, respectively. In the latter case, however, the burden borne by the main computer 8 can be lightened and the control means 9 can be made to serve a common control means for weighers having different specifications.

Since the switch Sw in the present embodiment can be opened and closed under the control of the microcomputer 5, the switch comprises a semiconductor such as an FET.

The method of adjusting the output value (dummy signal) of the bias circuit D will now be described.

First, the switch Sw is controlled to close to effect a changeover to an initial setting mode in which the prevailing output value of the A/D converter 4 is displayed on the display unit 6. The switch Sw is controlled to close by substituting a ROM in the main computer 8 with a ROM for initial setting purposes, or by a method of the kind disclosed by the applicant in the specification of Japanese Patent Application Laid-Open No. 58-63819, namely a method in which, with any one of the keys of the input unit 7 being held depressed, the power supply is turned on to make the changeover to the initial setting mode.

Next, with the weigher in the unloaded state, the variable resistor of the bias circuit D is adjusted in such a manner that the value displayed on the display unit 6 will attain a count value corresponding to a predetermined weight, e.g., a count value corresponding to the weighing capacity of the weigher. This mode is allowable to be omitted. In this case, the count value representing the initial state is to be stored. Since the operational amplifier 2 functions as an adder when the switch Sw is in the closed state, an output current from the bridge 1 corresponding to an initial load (the weight of the weighing dish), and an output current from the bias circuit D, flow into the feedback resistor Rf and, hence, are added. However, since the initial weight is understood to be zero based on the ordinary function of the weigher, solely the dummy signal is converted into a weight value and displayed when the weigher is free of an applied load. Accordingly, adjustment of the variable resistor is completed by causing the predetermined weight to be displayed on the display unit 6.

The operating sequence of the computers 5, 8 will now be described.

Figure 18:
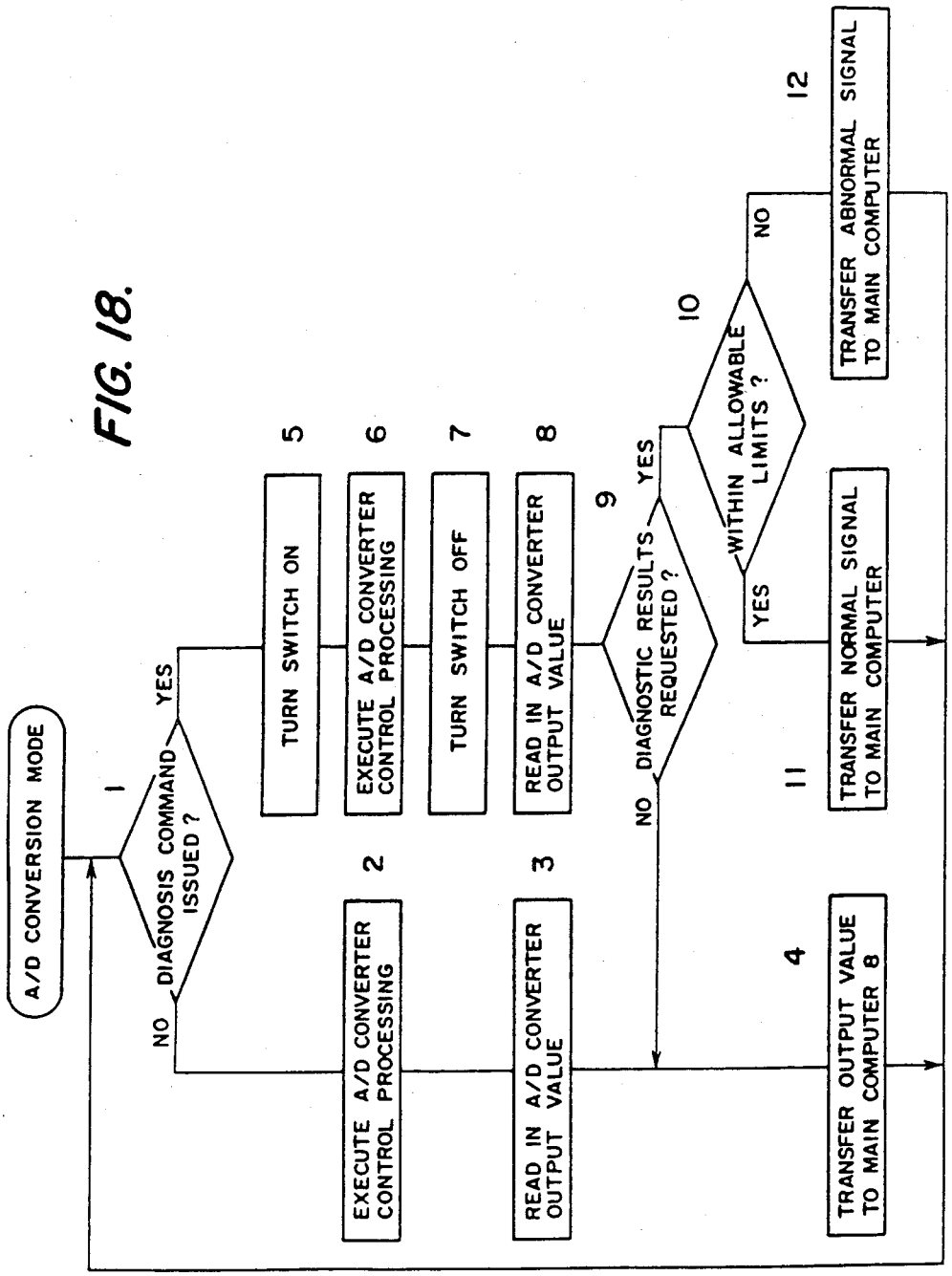
FIG. 18 is a flowchart illustrating an example of an operating sequence of a microcomputer included in the electronic weigher shown in FIG. 3.

FIG. 18 is a flowchart illustrating an example of an operating sequence of the microcomputer 5, which possesses both the control means 9 and sensing means 10. Steps 5 and 7 correspond to the control means 9, and step 10 corresponds to the sensing means 10.

In the flowchart of FIG. 18, the microcomputer 5 checks, at step 1, whether a diagnosis command is produced as an output by the main computer 8. In the absence of such a command, the microcomputer 5 executes step 2 to control the primary integration time of the A/D converter 4. When the A/D conversion ends, the microcomputer 5 reads in the output value of the A/D converter 4 at step 3, and transfers the output value to the main computer 8 at step 4, after which the program returns to the process step 1. This processing is repeated when the system is in the ordinary weighing mode.

When the main computer 8 issues a diagnosis command, the microcomputer 5 shifts from step 1 to step 5 to execute diagnosis of the amplification circuitry. Specifically, the microcomputer 5 closes the switch Sw at step 5 and, at step 6, executes control processing similar to that of step 2. When A/D conversion processing ends, the microcomputer 5 opens the switch Sw at step 7 and then reads in the output value of the A/D converter 4 at step 8. Next, at a step 9, the microcomputer 5 determines whether the aforementioned diagnosis command contains a command requesting dignostic results. If the decision is negative, then the program moves to the step 4 where the output of the A/D converter 4 is transferred to the microcomputer 8. If the request command is found at step 9, then the diagnostic results are obtained at a step 10. At step 10, the microcomputer 5 determines whether the output value from the A/D converter 4 lies within preset allowable limits, e.g., within tolerance with respect to a count value correponding to the weighing capacity of the weigher. Since the criterion for rendering the decision here will differ depending upon the type of weigher, the main computer 8 ordinarily is equipped with the sensing means 10. Therefore, in a case where the main computer 8 is provided with the sensing means 10, as shown in FIG. 2, the microcomuter 5 will not execute this route of the flowchart.

If the decision rendered at step 10 is that the output of the A/D converter 4 is normal, the microcomputer 5 transfers the normal signal to the main computer 8 at step 11. If the decision at step 10 is that the output is abnormal, the microcomputer 5 transfers the abnormal signal to the main computer 8 at a step 12. The program then returns to process step 1.

Figure 19:
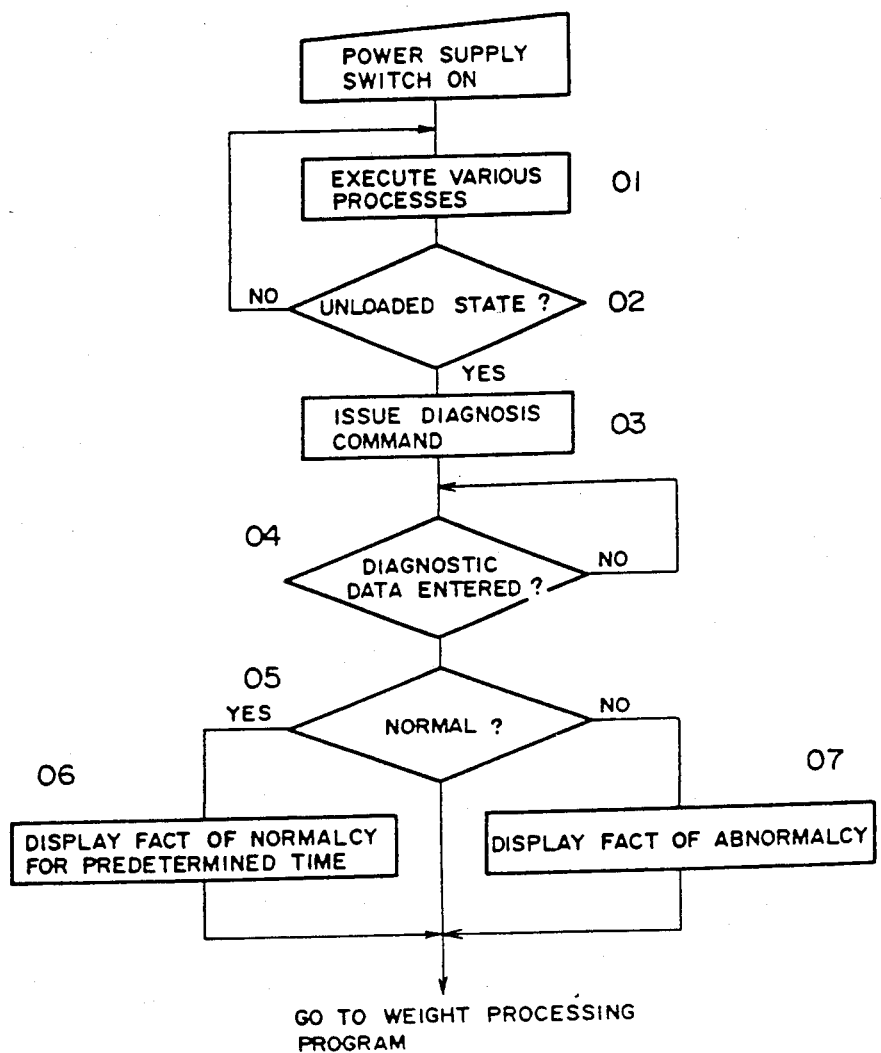
FIG. 19 is a flowchart illustrating an example of an operating sequence of a main computer included in the electronic weigher shown in FIG. 2.

FIG. 19 is a flowchart illustrating an example of an initial setting operating sequence performed by the main computer 8. Step 05 of this flowchart corresponds to the sensing means 10.

When the power supply is turned on, the main computer 8 performs various initial settings at a step 01 and determines at a step 02 whether the weigher is in an unloaded state. Specifically, the main computer 8 decides at step 02 that the unloaded state prevails if the output value of the A/D converter 4 lies within a range predictable for the initial weight of the weigher, and that the loaded state prevails if the initial prediction is exceeded. If the weigher is in an unloaded state, then the main computer 8 enters a diagnostic mode from a step 03 onward. If the weigher is loaded, then the main computer 8 returns to step 01 to repeat the initial setting processing. It should be noted that when the loaded state continues for a predetermined period of time upon introduction of power from the power supply, the main computer 8 causes the display unit 6 to present an error indication.

When processing shifts to the step 03, the main computer 8 delivers the diagnosis command to the microcomputer 5 and then repeats a step 04 to await the transfer of diagnostic data (the output value of the A/D converter or a decision signal indicative of normality or abnormality) from the microcomputer 5. When the data is transferred, the main computer 8 executes a step 05 at which the amplification circuitry is diagnosed by determining whether the transferred data is normal. Where the transferred data is the output value of the A/D converter 4, the processing at step 05 is the same as that at the step 10 of the flowchart of FIG. 18, described above. If the transferred data is a decision signal indicative of normality or abnormality, on the other hand, the processing at step 05 entails recognizing the decision signal.

If the decision rendered at step 05 is that operation is normal, then the main computer 8 causes the display unit 6 to indicate the fact that operation is normal for a prescribed period of time. If the decision is that operation is abnormal, on the other hand, then the malfunction indicating means 11 is actuated at a step 07 to present an indication of abnormal operation. It should be noted that in a case where the malfunction indicating means is made to double as the display unit 6, a malfunction indication can be given by blanking out entirely the weight display section of the display unit 6, or an error character can be made to appear in a specific display area of the display unit 6.

In the flowchart of FIG. 19, the arrangement is such that the diagnostic mode is established only when the power supply is turned on. However, an arrangement is possible in which the diagnostic mode is established in a case where the weigher remains in an unloaded state for a prescribed period of time during the ordinary weighing mode.

Figure 3:
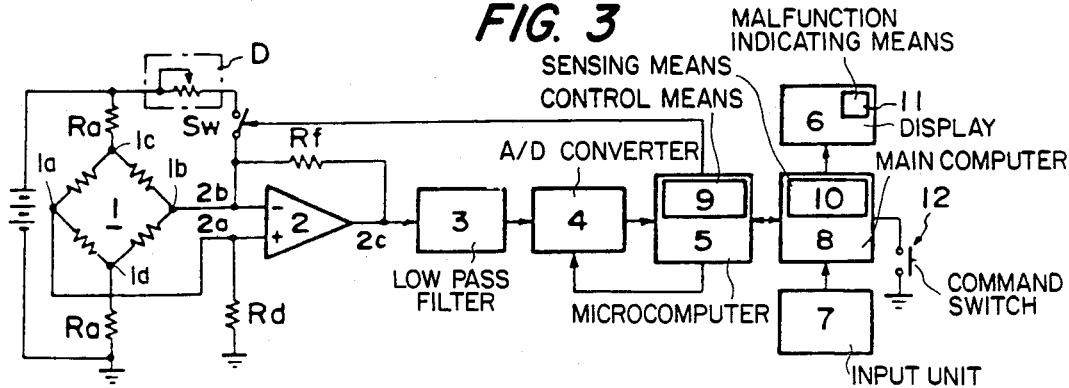
FIG. 3 is a block diagram illustrating, in simplified form, the construction of a third embodiment of an electronic weigher according to the present invention.

FIG. 3 illustrates a third embodiment of an electronic weigher according to the present invention. Portions identical with those shown in FIGS. 1 and 2 are designated by like reference characters and are not described again. In this embodiment, a command switch 12 is provided and the arrangement is such that the amplification circuitry will be diagnosed only when the command switch 12 is operated. The control means 9 is so adapted as to be set into operation only when the command switch 12 is operated. The command switch 12 comprises a special-purpose push-button, a numeric key on the input unit 7, or the like.

Figure 20:
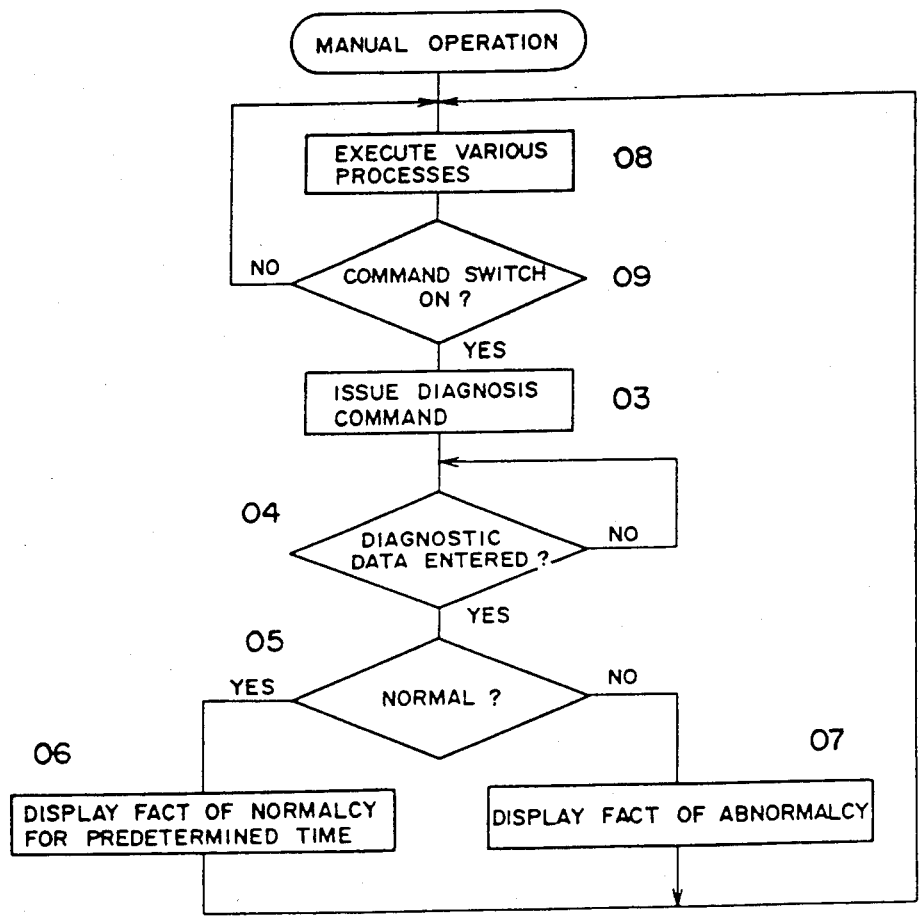
FIG. 20 is a flowchart illustrating an example of an operating sequence of a main computer included in the electronic weigher shown in FIG. 3.

FIG. 20 is a flowchart showing an example of an operating sequence performed by the main computer 8 of the electronic weigher depicted in FIG. 3. Processing from steps 03 through 07 in FIG. 20 are identical with the processing from steps 03 through 07 of FIG. 19.

When the command switch 12 is not being pressed, the main computer 8 repeatedly executes process steps 08 and 09 to carry out ordinary weighing processing, namely weighing and calculation processing, key check processing and display processing (the latter being interrupt processing). When the command switch 12 is pressed, the program moves from step 09 to step 03 to implement diagnosis of the amplification circuitry.

When diagnosis of the amplification circuit is executed, the weigher must be in the unloaded state, as mentioned above. In order to prevent inadvertent operation of the command switch 12 in the weighing mode, therefore, the arrangement is such that the function of the command switch 12 is inhibited when the weighing mode is in effect.

Figure 4:
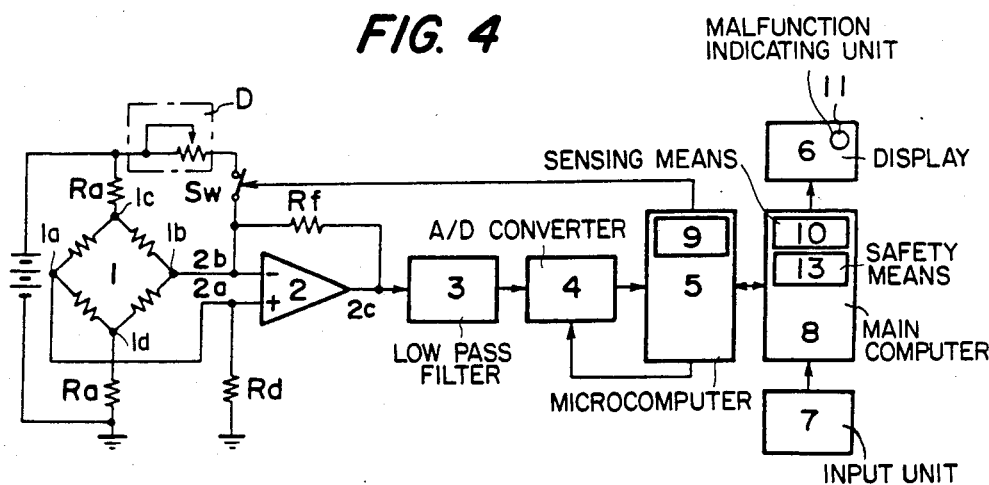
FIG. 4 is a block diagram illustrating, in simplified form, the construction of a fourth embodiment of an electronic weigher according to the present invention.

FIG. 4 illustrates a fourth embodiment of an electronic weigher according to the present invention. Portions identical with those shown in FIGS. 1 and 2 are designated by like reference characters and are not described again. In this embodiment, as in the embodiments illustrated in FIGS. 2 and 3, the microcomputer 5 is provided with the control means 9 for controlling the switch Sw on the basis of a command from the main computer 8, and the main computer 8 is provided with the sensing means 10 for sensing a malfunction in the amplification circuitry. The main computer 8 is further provided with safety means 13 for halting weigher function when the sensing means 10 senses a malfunction.

The sensing means 10 is adapted to sense a malfunction in the amplification circuitry from the operational amplifier 2 to the A/D converter 4 based on the output value of the A/D converter 4 when the switch Sw is closed, as in the foregoing embodiments. The safety means 13 is adapted in so that, when a malfunction is sensed continuously for a prescribed period of time, processing will exit from the ordinary main routine of the weigher and enter an endless routine for repeating solely an error display, whereby the ordinary function of the weigher is suspended.

The operating sequence of the computers 5, 8 will now be described.

Figure 21:
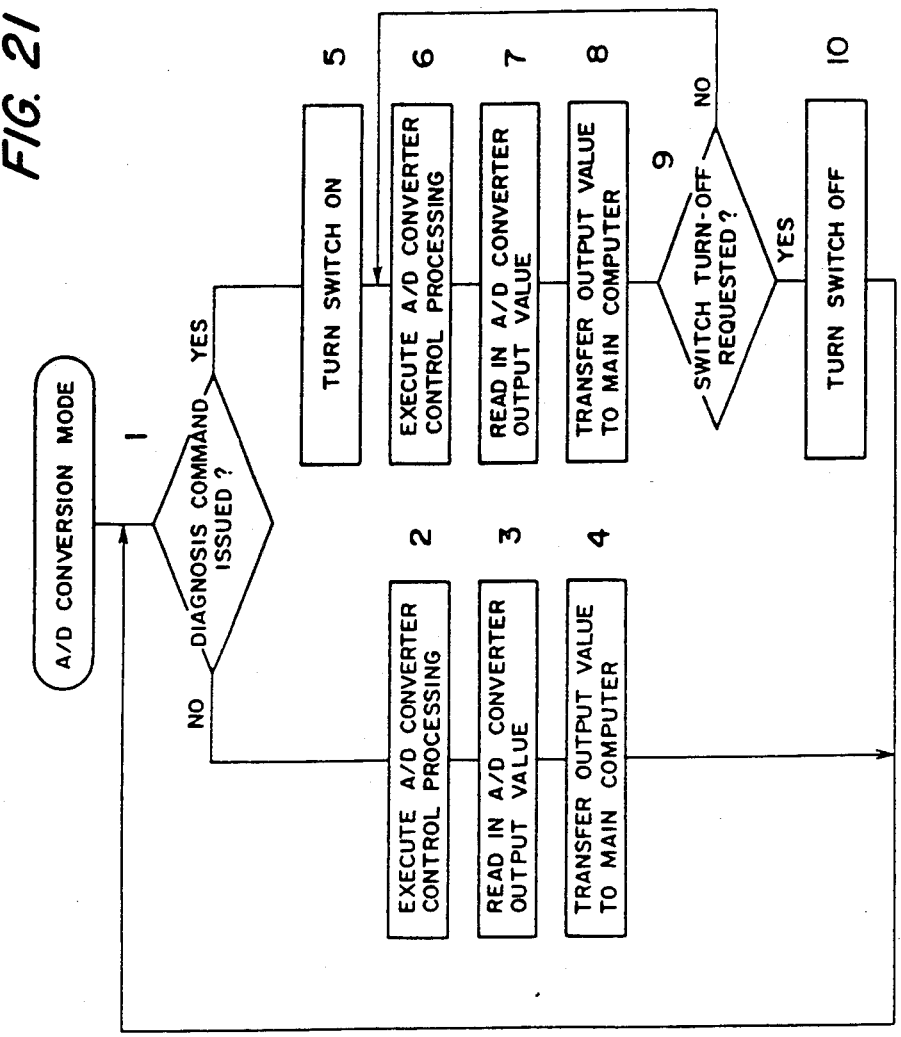
FIG. 21 is a flowchart illustrating an example of an operating sequence of a microcomputer included in the electronic weigher shown in FIG. 4.

FIG. 21 is a flowchart illustrating an example of an operating sequence performed by the microcomputer 5. However, steps 5 and 10 correspond to the operation of control means 9.

In the flowchart of FIG. 21, the microcomputer 5 checks, at step 1, whether a diagnosis command is produced as an output by the main computer 8. In the absence of such a command, the microcomputer 5 executes step 2 to control the primary integration time of the A/D converter 4. When the A/D conversion ends, the microcomputer 5 reads in the output value of the A/D converter 4 at step 3 and transfers the output value to the main computer 8 at step 4, after which the program returns to the process step 1. (It should be noted that when the arrangement is such that the total output value of the A/D converter 4 is calculated by the microcomputer 5, as set forth in the specification of Japanese Patent Application No. 58-25149, this calculated value is the value transferred to the main computer 8.) This processing loop is repeated when the system is in the ordinary weighing mode.

When the main computer 8 issues a diagnosis command, the microcomputer 5 shifts from step 1 to a step 5 to execute processing for controlling the switch Sw. Specifically, the microcomputer 5 closes the switch Sw at step 5 and, at step 6, executes control processing similar to that of step 2. When A/D conversion processing ends, the microcomputer 5 reads in the output value of the A/D converter 4 at step 7 and transfers the output value to the main computer 8 at step 8. Next, at a step 9, the microcomputer 5 determines whether the main computer 8 is producing a command requesting that the switch Sw be opened. If such a request command is being produced, then the switch Sw is opened at step 10 and the program returns to the process step 1. In the absence of the request command, the program returns to the step 6 where processing control for the A/D converter 4 is executed.

Figure 22:
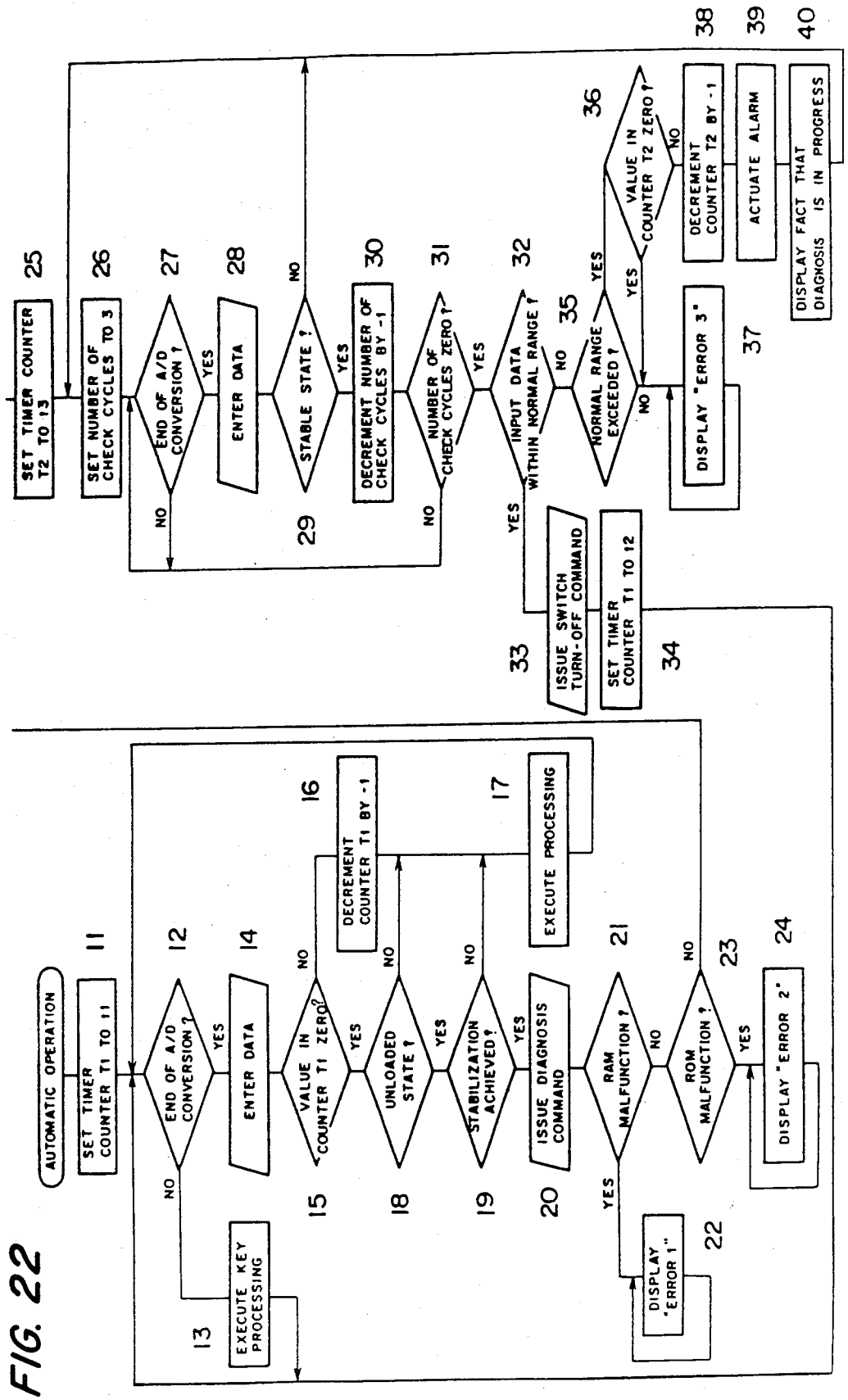
FIG. 22 is a flowchart illustrating an example of an operating sequence of a main computer constituting the electronic weigher shown in FIG. 4.

FIG. 22 is a flowchart illustrating an example of an operating sequence performed by the main computer 8. Step 32 of this flowchart relates to the operation of sensing means 10, steps 37, 39 correspond to the operation of malfunction indicating means 11, and the endless loop in which steps 22, 24 and 37 are executed repeatedly corresponds to the operation of safety means 13.

First, at an initial setting step (step 11), the main computer 8 sets a timer counter T1, which is for controlling the timing t1 at which the amplification circuitry is diagnosed, to t1, as an initial value. The initial value t1 is set to a time which reduces or eliminates the influence of power drift developed by the operational amplifier 2.

When the above-described setting operation is completed, the main computer 8 determines at a step 12 whether the microcomputer 5 has produced a completion signal, which signal is produced at the end of each A/D conversion. In the absence of the signal, the system is returned to step 12 by execution of prescribed key processing at step 13. If the end signal is produced, then weight data converted into a digital value is entered at a step 14. Next, the main computer 8 determines at a step 15 whether the value in the timer counter T1 is zero. If it is not, the value in the timer counter T1 is decremented by one at a step 16 and processing is then executed at a step 17. Thereafter, the program returns to the process of step 12. The processing at step 17 includes processing for converting a digital value into a weight value, processing for calculating a total price by multiplying a weight by a unit price, and the like.

If the decision rendered at the step 15 is that the value in the timer counter is zero, the time t1 set as the initial value will have expired. The main computer 8 therefore determines at a step 18 whether the weigher is in an unloaded state. It is decided that the unloaded state prevails if the weight data entered at step 14 lies within a range predictable as the initial weight of the weigher, and that the loaded state prevails if the weight data lies outside this range.

Since the amplification circuitry cannot be diagnosed if the weigher is loaded, the main computer 8 repeats the processing of the loop from steps 12 to 17 to await the unloaded state. When unloaded state is attained, the main computer 8 determines at a step 19 whether the weigher has stabilized. Stability is checked in order to confirm continuance of the unloaded state, thus to avoid any impediment to the ensuing self-diagnosis.

If the weigher is unstable, the main computer 8 repeats the processing of the loop from steps 12 to 17 to await stabilization. When the weigher has stabilized, the main computer 8 sends the diagnosis command to the microcomputer 5 at a step 20, so that the program moves to the diagnostic mode from this point onward.

In the diagnostic mode, the main computer 8 first performs a RAM check at a step 21 and then a ROM check at a step 23. since a time delay arises in a step response owing to the filter circuit 3 even when the switch Sw is closed, steps 21 and 23 are executed to make effective use of the waiting time. The RAM is a memory for temporarily storing such data as unit price, weight and total price, and the ROM is a memory for storing programs, a character conversion table and the like. Both memories are incorporated within the main computer 8. The RAM check is performed by moving registered data out to a surplus area and checking the registration area.

If a problem is found as a result of the RAM check, the program enters an endless loop in which the characters "ERROR 1" are repeatedly displayed. If no malfunction is found, the program moves to the ROM check. If a problem is found as a result of the ROM check, the program enters an endless loop in which the characters "ERROR 2" are repeatedly displayed. If no malfunction is found, the program moves to processing from a step 25 onward. When the program enters the endless loop for repeatedly displaying the error characters, the other functions of the weigher are suspended in their entirety. This is to avoid problems due to erroneous operation of the weigher.

Next, at a step 25, the main computer 8 sets a timer counter T2 to a display time (t3) for displaying the fact that the weigher is undergoing self-diagnosis (as by displaying characters stating to the effect that self-diagnosis is in progress). Then, at a step 26, the main computer 8 sets the number of times (e.g., three) the stability of the output value from the A/D converter 4 is to be checked. The reason for this is the danger that an error may appear in the results of self-diagnosis if the output value of the A/D converter 4 is unstable. Accordingly, when the output value is found to be unstable, the main computer 8 repeatedly executes the loop from step 26 to step 29 to await stabilization of the output value.

When setting of the number of check cycles is completed, the main computer 8 repeats step 27 to wait for the completion signal from the A/D converter 4. When the completion signal is issued from the microcomputer 5, data undergoing diagnosis is applied at a step 28 and, at a step 29, it is determined whether the output value of the A/D converter 4 is stable. If it is stable, then the main computer 8 decreases the number of check cycles by one at a step 30 and repeats the loop from steps 27 to 31 until the number of check cycles reaches zero. At such time the output value of the A/D converter 4 is considered to be perfectly stable. The main computer 8 therefore determines whether the input data read in last lies within normal limits, i.e., whether the data lies within tolerance with respect to the count value equivalent to the weighing capacity of the weigher, which corresponds to the dummy signal. If the data falls within the normal limits, the main computer 8 at a step 33 supplies the microcomputer 5 with the command to open the switch Sw. At the next step 34, the timer counter T1 is set to the time for the next diagnosis (e.g., one hour), and processing returns to the step 12. Accordingly, one hour later, self-diagnosis of the amplification circuitry will be performed again.

If the data is not within the normal range, however, this can be construed as indicating that the weigher has been loaded down with an article inadvertently during self-diagnosis, with the result that the normal limits have been exceeded. Accordingly, the main computer 8 determines, at a step 35, whether the normal limits are exceeded. If the answer is affirmative, the program moves to process steps from step 36 onward to issue an alarm calling for removal of the load. If the answer at step 35 is negative, then this means that the amplification circuitry has developed a malfunction. As a result, the program moves directly to an endless loop for repeatedly displaying "ERROR 3".

The main computer 8 determines at the step 36 whether the value in the timer counter T2 is zero. If the answer is negative, the value is decreases by one at a step 38, an alarm is activated at the next step 39, and the fact that diagnosis is in progress is displayed at the following step 40. The program then moves to the step 26. When the operator notices that the weigher is being loaded by the article, removes the article and, as a result, the input data falls within the normal limits during the repeated processing of the loop from steps 35 to 26, the main computer 8 shifts from the step 32 to the step 33 to end the self-diagnosis of the amplification circuitry. If the data is still abnormal even after expiration of the alarm time (t3), it is construed that the amplification circuit is malfunctioning. Accordingly, the main computer 8 moves from step 36 to step 37 to execute the endless loop for the repeated display of "ERROR 3". All other functions of the weigher are thus suspended to prevent problems caused by erroneous weigher operation.

In the present embodiment, the arrangement is such that all display processing inclusive of the error displays is executed by an interrupt at a prescribed period. Furthermore, error numbers are affixed to the error displays, as in "ERROR 3", in order to specify the location of the failure so that the malfunctioning component part may be replaced with ease.

Figure 23:
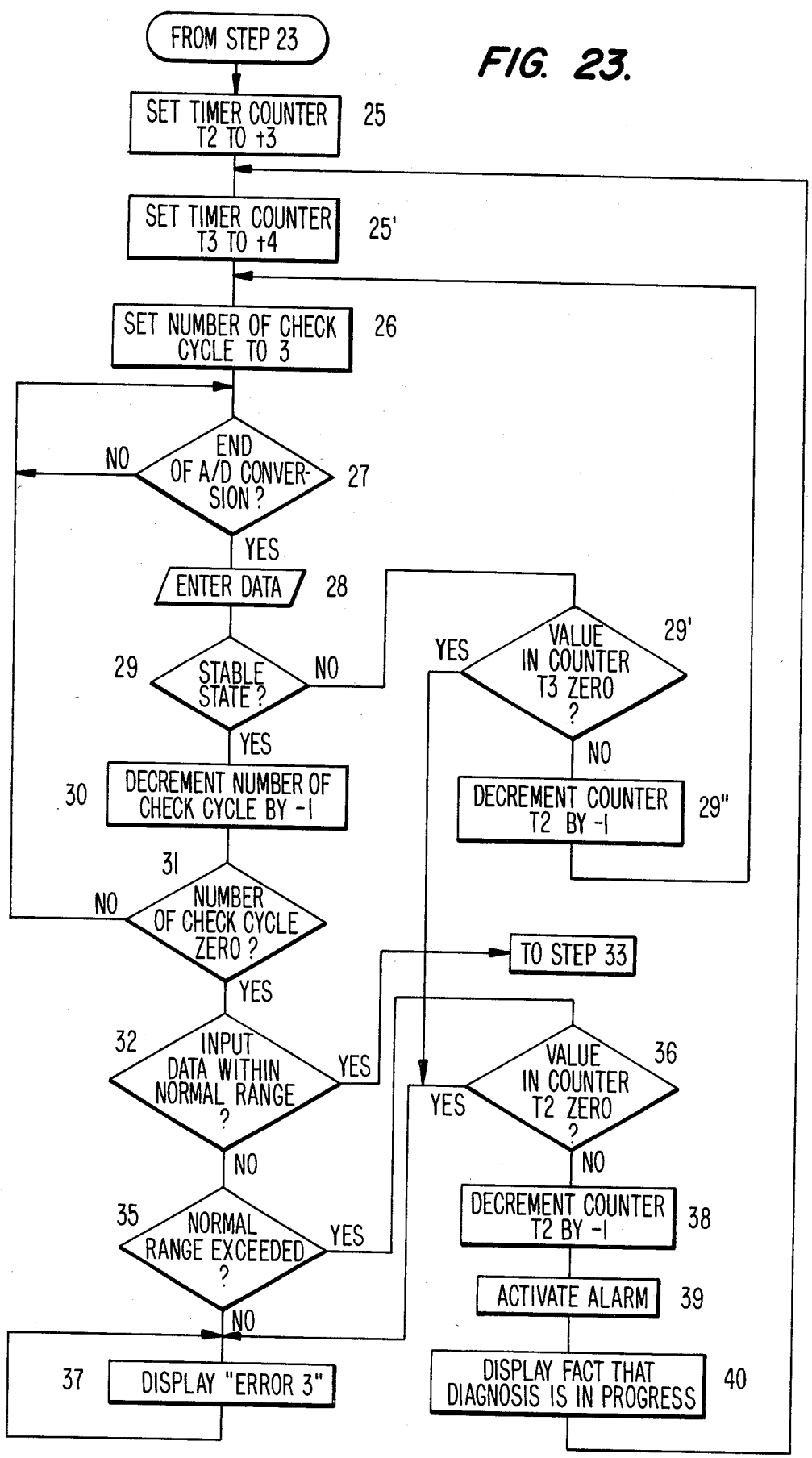
FIG. 23 is a flowchart illustrating a modification of the embodiment shown in FIG. 22.

The flowchart shown in FIG. 23 is a modification of the embodiment shown in the embodiment of FIG. 22. Although the embodiment shown in FIG. 22 executes the self-diagnosis after the operation of the A/D converter has been stabilized in step 29, the modification is further provided with a timer T3 for checking the period of time during which the A/D converter is in an unstable state (step 25'). If the A/D converter is still in the unstable state even when the period of time t4 set by the timer T3 has elapsed, the main computer goes to the step 37 for error display.

Steps 29' and 29" are newly added for this purpose.

Figure 5:
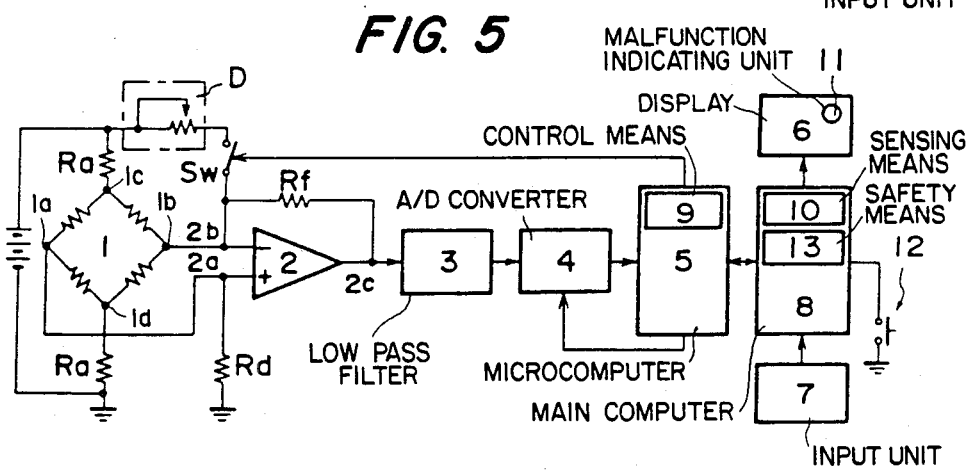
FIG. 5 is a block diagram illustrating, in simplified form, the construction of a fifth embodiment of an electronic weigher according to the present invention.

FIG. 5 illustrates a fifth embodiment of an electronic weigher according to the present invention. Portions identical with those shown in FIGS. 1 through 4 are designated by like reference characters and are not described again. In this embodiment, the command switch 12 is provided and the arrangement is such that the amplification circuitry will be diagnosed only when the command switch 12 is operated. The control means 9 is so adapted as to be set into operation only when the command switch 12 is operated, and the command switch 12 comprises a special-purpose push-button.

Figure 10:
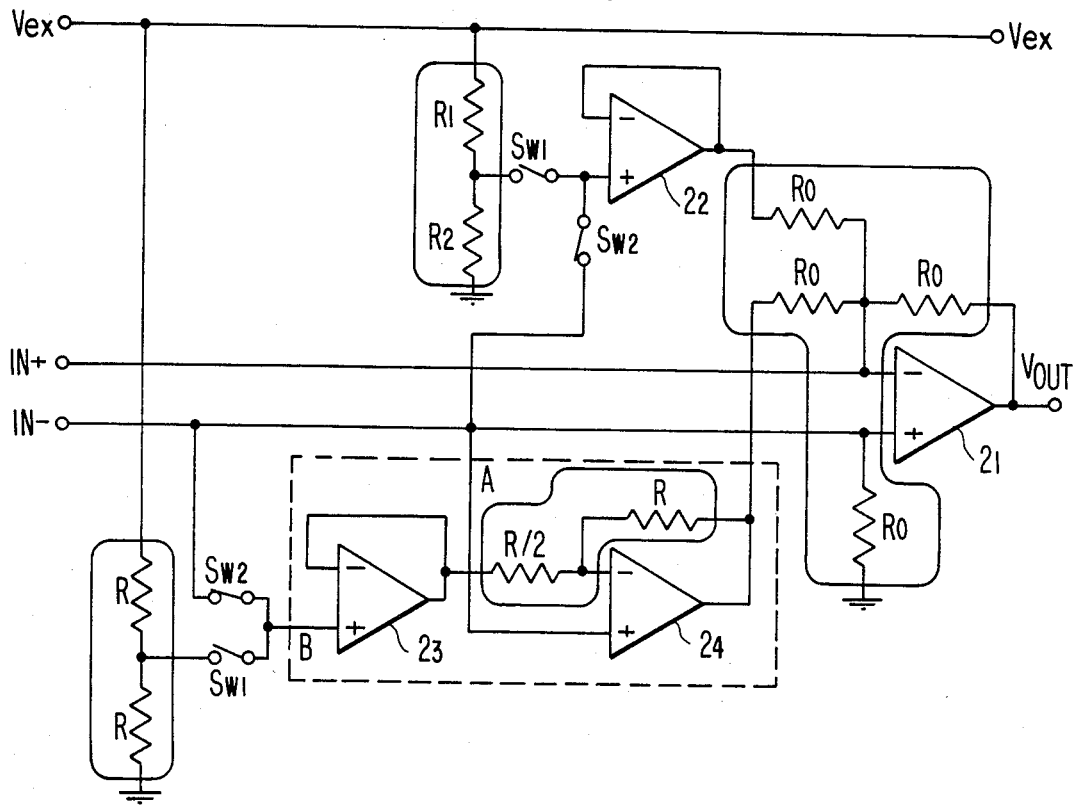
Figure 24:
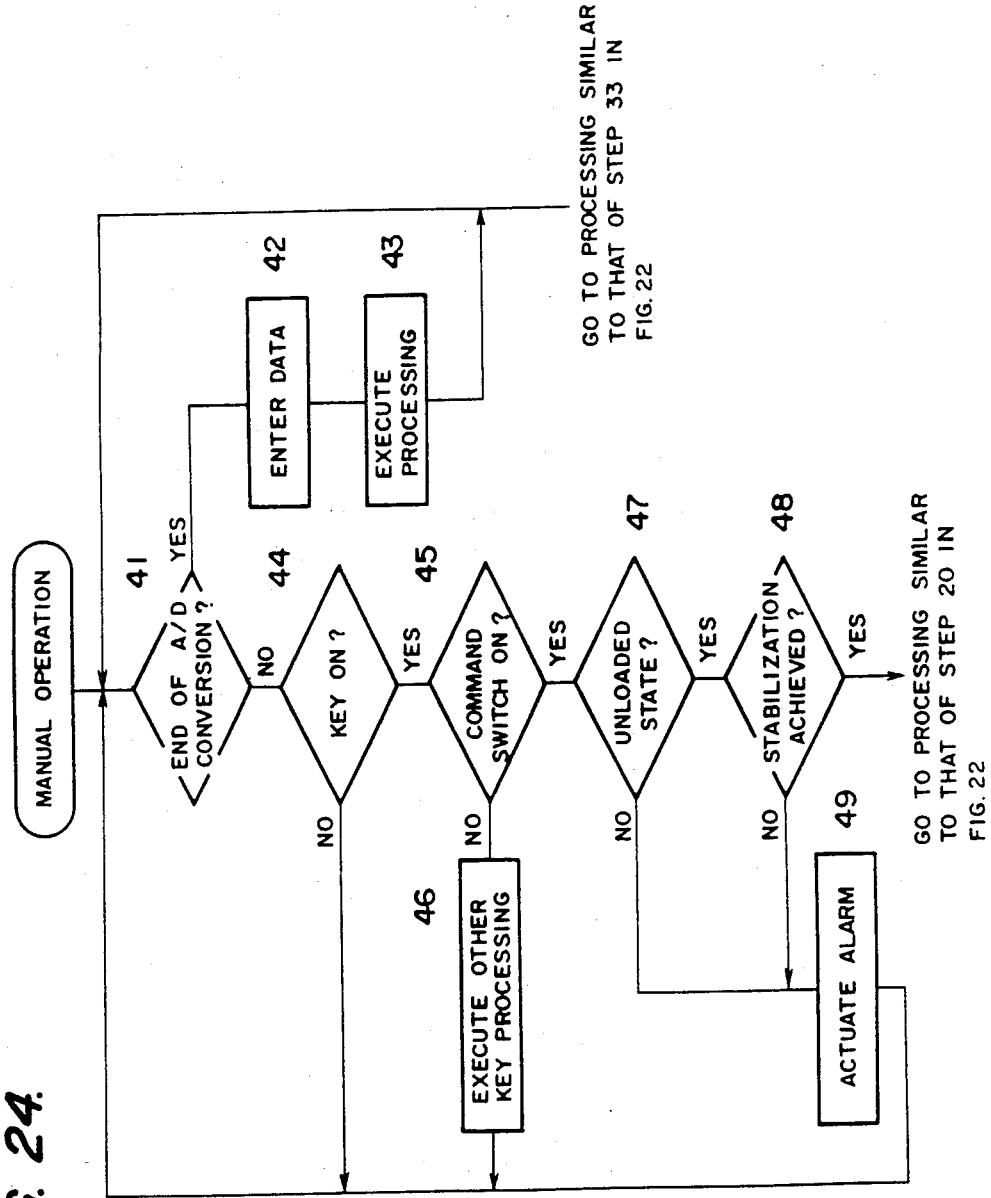
FIG. 24 is a flowchart illustrating an example of the principal portion of an operating sequence of a main computer constituting the electronic weigher shown in FIG. 5.

FIG. 24 is a flowchart showing an example of a principal portion of an operating sequence performed by the main computer 8 depicted in FIG. 5. This flowchart differs from that shown in FIG. 22 in that the processing indicated by steps 11, 15, 16 and 34 in FIG. 22 is deleted and replaced by processing indicated by newly added steps 45, 47, 48, 49. In the present flowchart, therefore, the steps from 20 through 33 shown in FIG. 10 are the same as in the present embodiment and, hence, are not shown. It should be noted that the processing indicated by steps 44 and 46 in FIG. 24 are the same in content as the key processing step 13 of FIG. 22.

In the flowchart of FIG. 24, the main computer 8 first executes the key processing routine from step 44 onward during the absence of the completion signal from the A/D converter at step 41. If the result of checking whether the command switch is on at step 45 is YES, then it is determined at step 47 whether the weigher is unloaded. If the answer is affirmative, then it is determined at step 48 whether stabilization has been attained. If the answer here is affirmative, processing identical with that from step 20 onward in FIG. 22 is executed. The main computer 8 executes diagnosis of the ROM and RAM, which are built in the main computer, and of the amplification circuitry. If the results are normal, the program returns to step 41 through processing identical with that of step 33 in FIG. 22.

If the decision rendered at step 47 or 48 is negative, then the main computer 8 activates an alarm at step 49 to inform of the fact that the weigher is not in a state capable self-diagnosis, i.e., that the weigher should be placed in an unloaded state. This is followed by returning to step 41. When the command switch 12 is pressed with the weigher in the unloaded state, the main computer 8 executes self-diagnosis of the weigher via steps 45 through 48.

Next, embodiments of an electronic weigher will be described with reference to the accompanying drawings FIGS. 6 through 11, the electronic weigher having a circuit which is capable of automatically diagnosing a failure in amplification circuitry with high accuracy by removing a drift caused by temerauter change. Circuits shown in FIGS. 7 through 11 described below can be used in electronic weighers of manual operation or computer control which are described with reference to FIG. 1 through FIG. 5.

Figure 6:
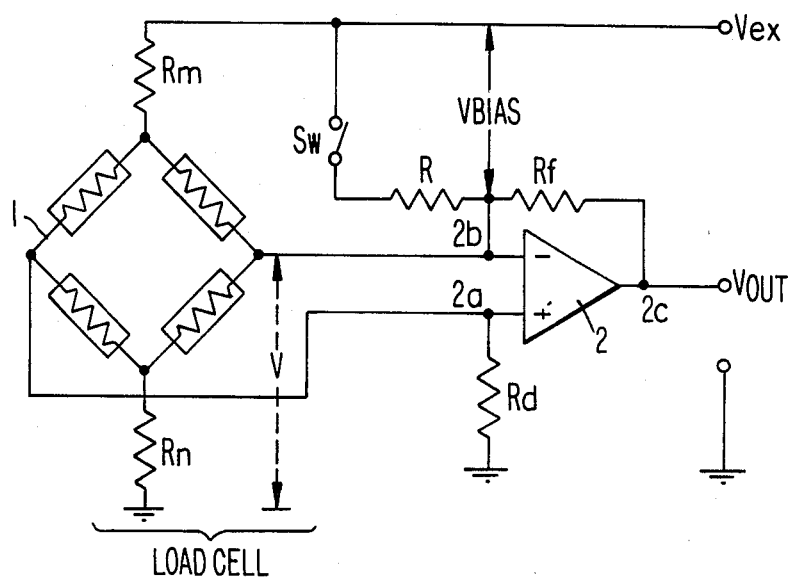
FIG. 6 is a circuit diagram illustrating the principle of the present invention in which a drift is removed.

FIG. 6 is a circuit diagram explanatory of the principle of the present invention. A bridge circuit 1 of a load cell has output terminals connected to positive and negative input terminals 2a, 2b of an operational amplifier 2, respectively. Connected across the negative input terminal 2b and an output terminal 2c of the operational amplifier 2 is a feedback resistor Rf. Connected across the positive input terminal 2a and ground is a voltage dividing resistor Rd having the same resistance value as the feedback registor Rf. The operational amplifier 2 and bridge circuit 1 construct a differential amplifier circuit.

Connected across the switch Sw and the feedback resistor Rf is a bias resistor R. When the switch Sw is closed, an output current from the bridge circuit 1 and a current through the bias resistor R flow through the feedback resistor Rf and the operational amplifier functions as an adder. The output side of the operational amplifier is connected to an non-illustrated flicker preventing low-pass filter, an A/D converter for converting an analog signal to a digital signal, and a microcomputer for executing various kinds of arithmetic operation.

Such a circuit has a self-diagnosis system for sensing a failure in amplifier circuitry from a pre-amplifier to the input terminal of the A/D converter. The system senses the failure by an output from A/D converter which is produced when a current through the bias resistor R, which, for example, corresponds to an output produced by the load cell when a reference weight is loaded on an electronic weigher, is added to an output produced by the load cell when the electronic weigher is in an unloaded state.

With the bridge circuit having a thermo-sensitive resistor (Rm) at the input side thereof as shown in FIG. 6, however, an electric potential (V) across the output terminals of the load cell varies in accordance with change in a resistance value caused by temperature. For this reason, a change in the bias voltage (Vbias) causes a change in the current which flows through the bias resistor R when the self-diagnosis is executed, and the change appears as an error.

$$Vex = Vbias + V \ldots \quad (1)$$

where Vex is a constant DC voltage having a prescribed amount of value, and Vbias and V are variable.

According to the present invention, the amount of drift of electric potential at the output terminal of the load cell which is changed by temperature is sensed and the current corresponding to the reference weight, which is applied to a primary amplifier when the self-diagnosis is executed, is corrected to a constant value by the amount of drift sensed.

Figure 7:
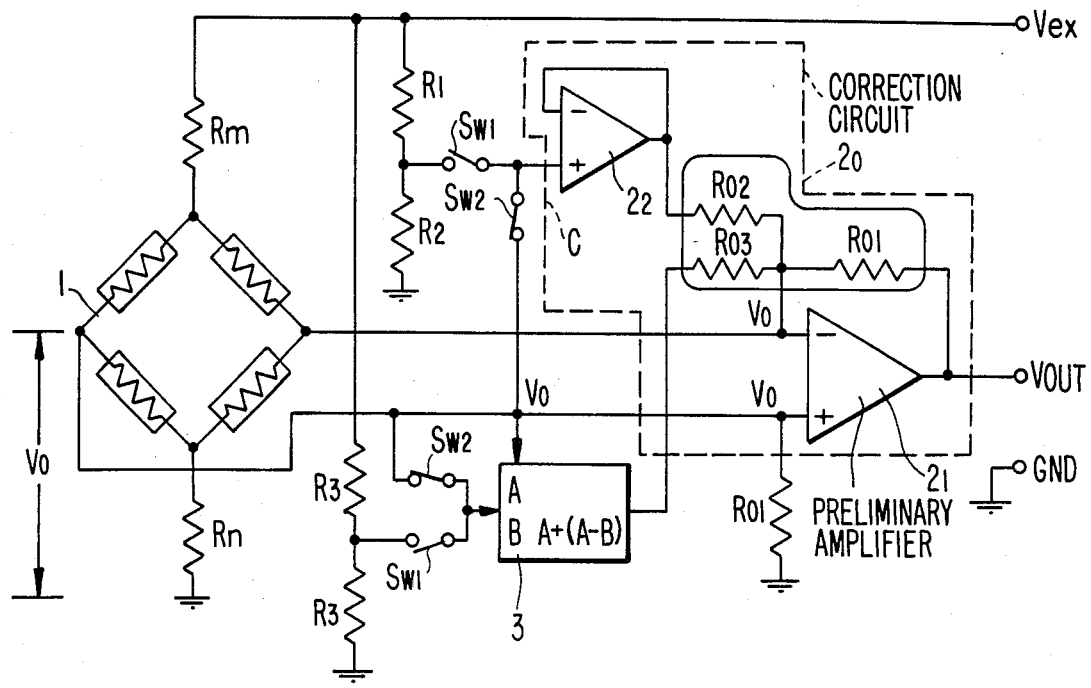
FIGS. 7 through 11 show circuit diagrams of various embodiments in which a drift is removed.

FIG. 7 is a circuit diagram illustrative of a first embodiment of the present invention which checks a failure with high accuracy by removing a drift. As shown in FIG. 7, a correction circuit comprised of a primary operational amplifier $2_1$, an operational amplifier $2_2$, resistors $R_{01}$ through $R_{03}$ are connected to the output side of a bridge circuit.

Supposing that it is possible to change the resistors $R_{01}$ through $R_{03}$ of the correction circuit in accordance with the circuit constant of the drift amount sensing circuit, the circuit operates as follows, where $R_{01} = R_{02} = R_{03}$.

(1) The drift amount sensing circuit 3 senses the amount of drift (A−B) of the voltage at the output terminal of a load cell on the basis of the respective voltages entered to the terminals A and B thereof. The drift amount sensing circuit 3 adds the amount of drift sensed to the input voltage at the terminal A entered from and outputs the added value [A+(A−B)]. The value of the output signal, however, can be changed in accordance with the circuit constant of the drift amount sensing circuit.

In a correction circuit 20, a current is added at the negative input terminal of a primary operational amplifier based on the voltage (C) entered from the terminal C and the voltage [A+(A−B)] entered from the drift amount sensing circuit. As a result, a current shown below flows through the feedback resistors $R_{01}$ with respect to the correction circuit.

$$-[(C - V_0)/R_{02} + \{A + (A - B) - V_0\}/R_{03}] \quad (2)$$

(2) In a normal state, switches $Sw_1$ are turned off, switches $Sw_2$ are turned on, and the A and B terminals of the drift amount sensing circuit are supplied with the voltage $V_0$ at the output terminal of the load cell, respectively. The the drift amount sensing circuit produces a voltage determined by the following equation.

$$A + (A - B) = V_0 + (V_0 - V_0) = V_0 \ldots \quad (3)$$

The terminal C of the correction circuit is also supplied with the voltage $V_0$ at the output terminal of the load cell. Consequently, the current added by the correction circuit is shown as follows.

$$-[(C - V_0)/R_{02} + \{A + (A - B) - V_0\}/R_{03}] = \quad (4)$$

$$(V_0 - V_0)/R_{02} + \{V_0 + (V_0 - V_0) - V_0\}/R_{03} = 0$$

As a result, the output from the load cell is entered to the primary operational amplifier without being affected by the drift amount sensing circuit and the correction circuit in the normal state.

(3) When a self-diagnosis is executed, the switches $Sw_1$ are turned on and the switch $Sw_2$ are turned off thereby to supply the voltage $V_0$ to the terminal A of the drift amount sensing circuit and the voltage of, for example, (½)Vex or any optional voltage to the terminal B of the same. As a result, the dirft amount sensing circuit produces a voltage determined by the following equation.

$$A + (A - B) = V_0 + (V_0 - Vex/2) = 2V_0 - Vex/2 \ldots \quad (5)$$

Since the terminal C of the correction circuit is supplied with the voltage $\}R_2/(R_1+R_2)\}Vex$, a current added by the correction circuit is determined by the following equation.

$$-[(C - V_0)/R_{02} + \{A + (A - B) - V_0/R_{03}\}] = \quad (6)$$

$$-[\{R_2/(R_1 + R_2)\} Vex - V_0]/R_{02} +$$

$$\{2V_0 - Vex/2 - V_0\}/R_{03} =$$

$$-\{R_2/(R_1 + R_2) - (\tfrac{1}{2})\} Vex/R$$

where $R = R_{02} = R_{03}$.

As mentioned above, when the self-diagnosis is executed, the negative input terminal of the primary operational amplifier is capable of being supplied with the constant current determined by the equation (6) which is not affected by the voltage $V_0$ produced at the output terminal of the load cell. Thus, a highly accuracte self-diagnosis, which is not affected by temperature, can be effected by setting output voltage at this time to the value which corresponds to the output from the primary operational amplifier when the reference weight is loaded.

Figure 8:
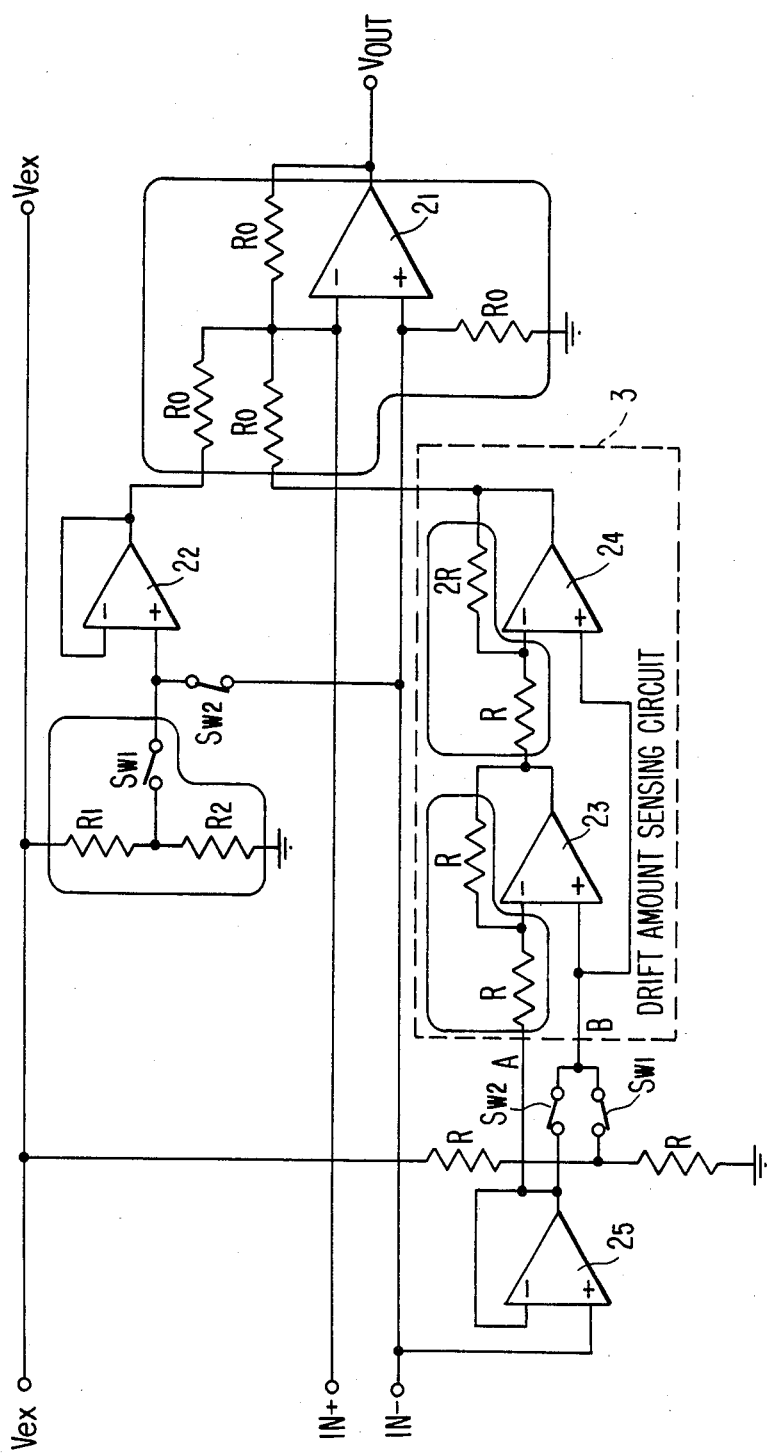

FIG. 8 is a self-diagnosis circuit diagram of a second embodiment of the present invention which employs common resistors $R_{01}$ in place of the resistors $R_{01}$ through $R_{03}$ in FIG. 7. A drift amount sensing circuit employs operational amplifiers $2_3$ and $2_4$ connected in series. The resistors in circulars in the drawings illustrative of the respective embodiments, for example, the resistors R, 2R, $R_1$, $R_2$, $R_3$ in this embodiment have an excellent relative temperature characteristic.

Figure 9:
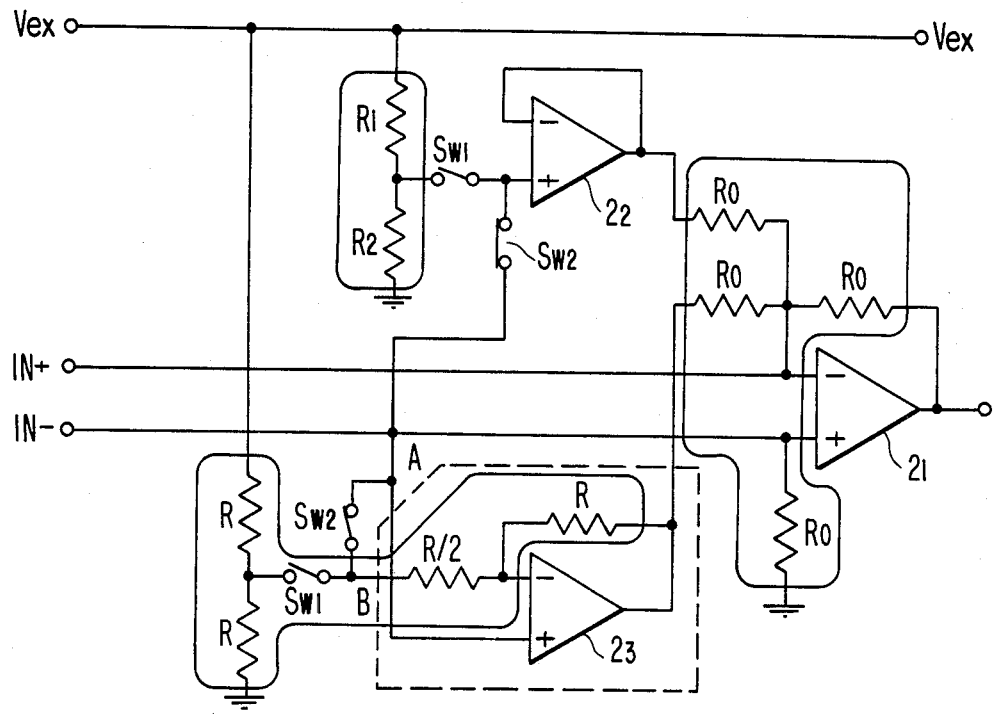

FIG. 9 is a circuit illustrative of a third embodiment of the present invention.

A drift amount sensing circuit of the embodiment has a negative input terminal connected to a resistor of R/2. A switch $Sw_2$ is connected across a switch $Sw_1$ and the switch $Sw_2$ of a corrction circuit. Switches $Sw_1$ and $Sw_2$ on the side of the drift amount sensing circuit have a resistance value which is substabtially negligible compared with a resistor R.

FIG. 10 is a circuit diagram of a fourth embodiment of the present invention, which is a modification of the second embodiment having a drift amount sensing circuit different from that of the fourth embodiment. Switches $Sw_1$ and $Sw_2$ have a resistance value which does not affect the circuit.

The switches $Sw_1$ and $Sw_2$ of the embodiments 1 through 4 may be operated manually as well as automatically. These embodiments are used in electronic weighers and combinatorial weighing apparatus.

Figure 11:
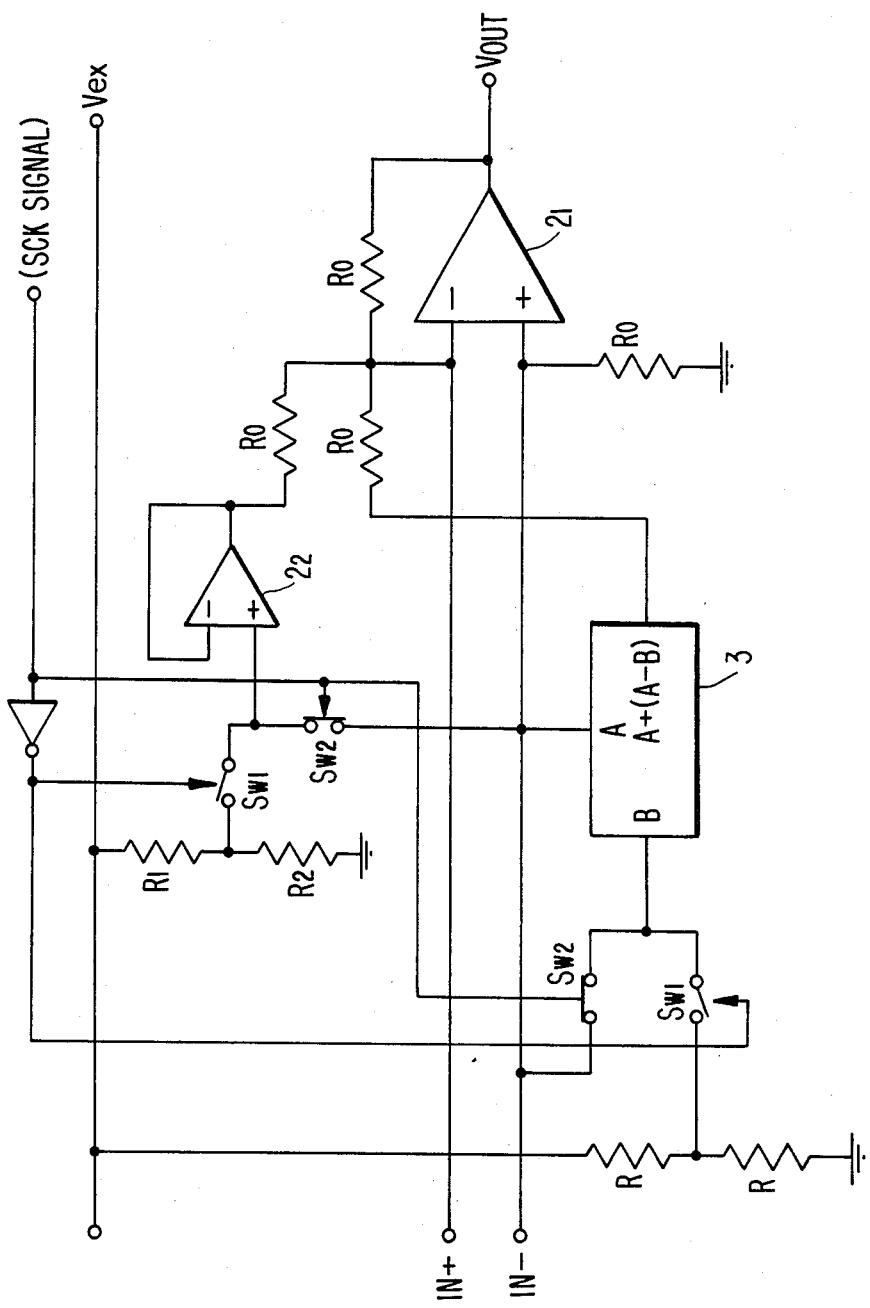

FIG. 11 is a circuit diagram in which the present invention is used in a combinatorial weighing apparatus, wherein a self-check signal (SCK signal) produced by a microcomputer is fed to a self-check circuit of a weighing machine without load when the weighing apparatus starts operation or fed thereto in a prescribed cycle when no article is supplied to the weighing machine.

Figure 12:
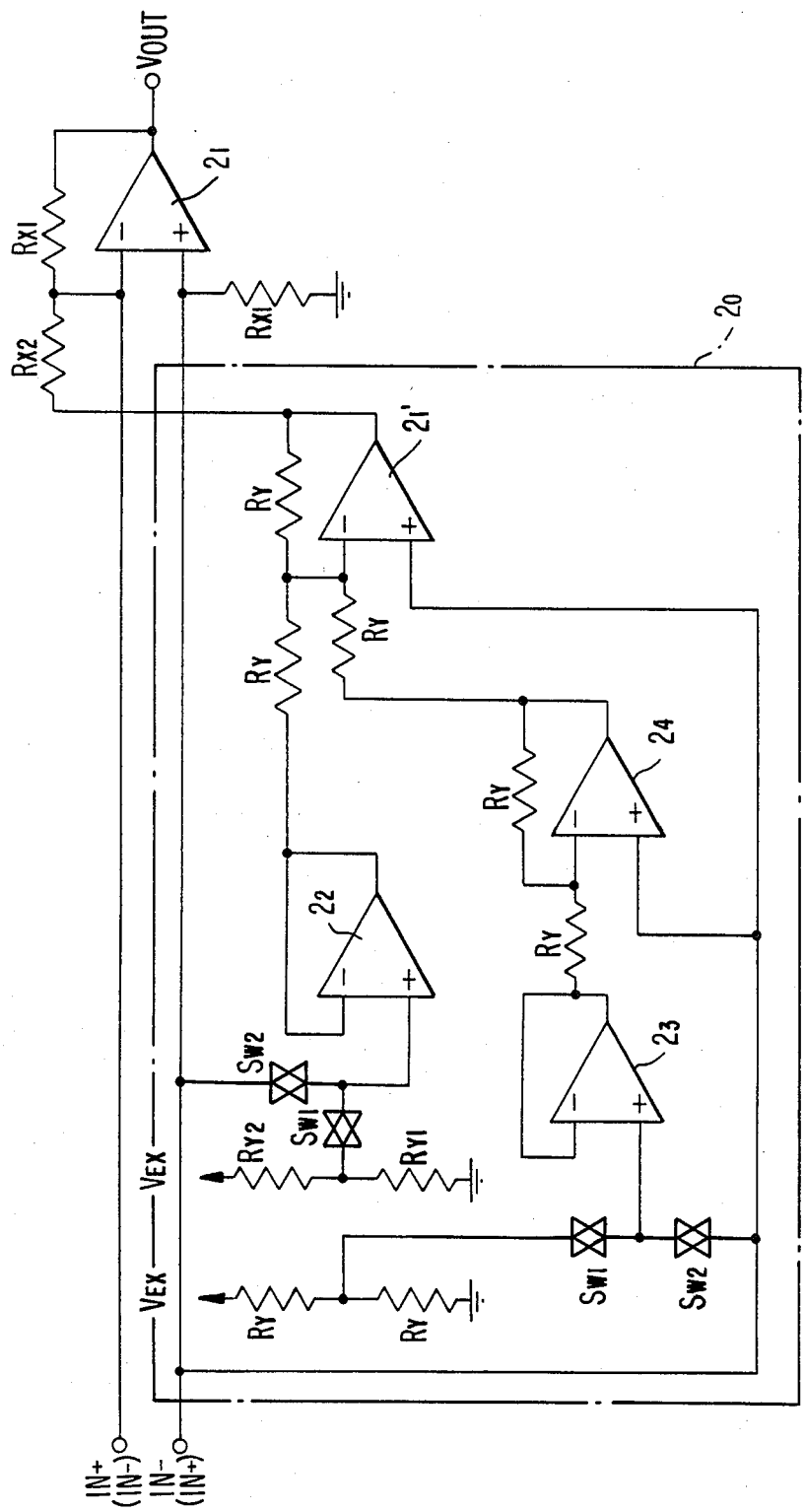
FIGS. 12 through 14 show circuit diagrams of a sixth embodiment of an electronic weigher according to the present invention.

FIG. 12 is a circuit diagram illustrative of a sixth embodiment of the present invention. The embodiment has a differential amplifier circuit $2_0$ comprised of operational amplifiers $2_2$, $2_3$, $2_4$ for producing a reference voltage and primary adding circuit $2_1'$. Each of three resistors Ry to be connected to the adding circuit $2_1'$, two resistors to be connected to an operational amplifier $2_4$ (reversing circuit) and two resistors for producing the reference voltage, each of the resistors is arranged in a similar package to contruct a resistor network of excellent relative temperature characteristic. Otherwise, all of the resistors are arranged in a package to contruct a resistor network of excellent relative temperature characteristic.

Figure 13:
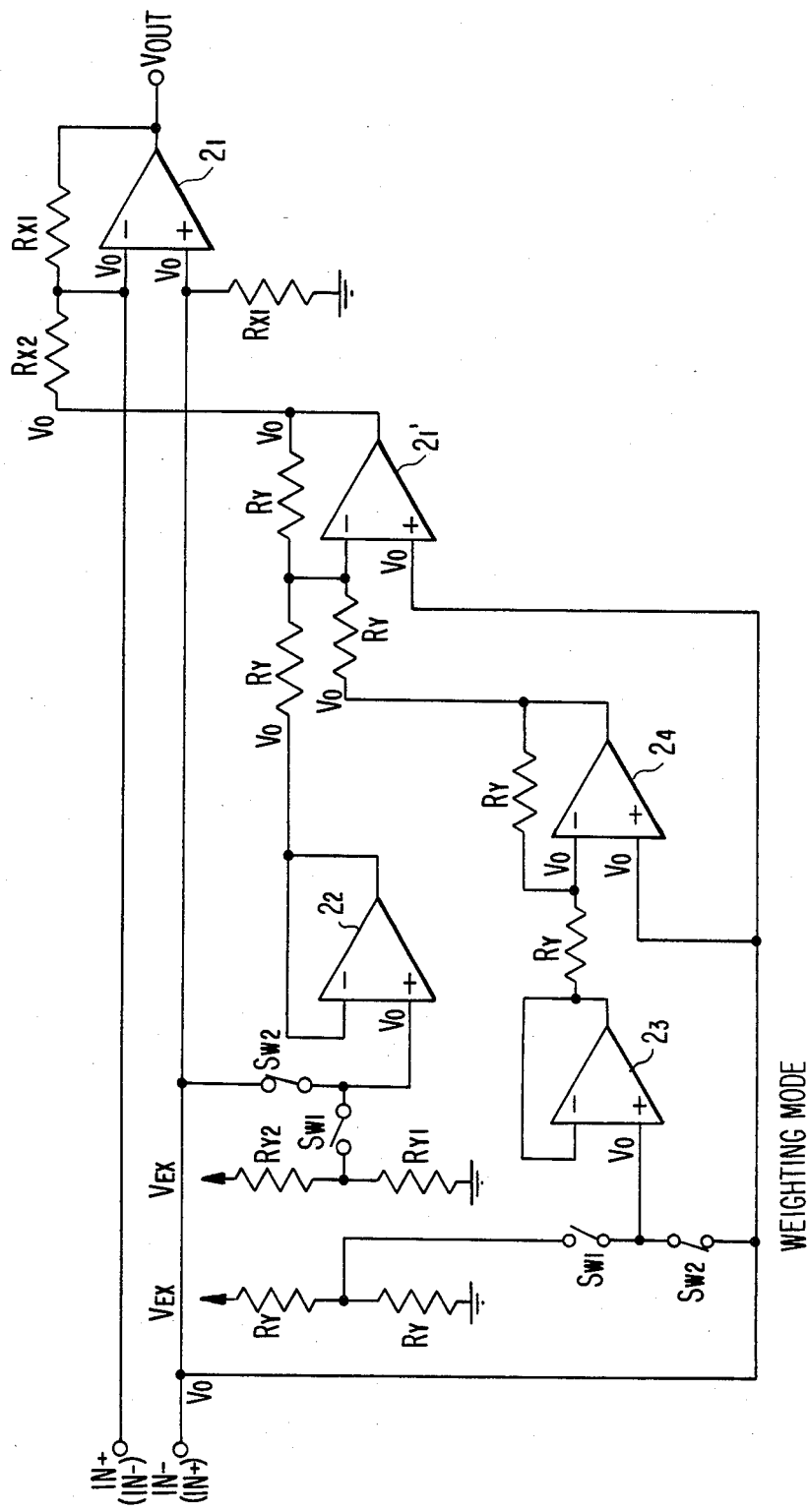

FIG. 13 is a circuit diagram illustrative of the sixth embodiment which is operated in a weighing mode, wherein switches $Sw_2$ connected to a signal line in coupled with a load cell are turned on and switches $Sw_1$ connected to the voltage dividing resistors are turned off. Then, the output voltage ($V_0$) from the load cell is fed to the operational amplifiers $2_2$, $2_3$, $2_4$, the adding circuit $2_1'$ and the non-reversing input terminal of an arithmetic circuit $2_1$, respectively. Consequently, the output from each of the operational amplifier $2_2$, $2_3$, $2_4$ and the adding circuit $2_1$ become $V_0$ as shown in FIG. 13 supposing that each of the respective operational amplifiers is an ideal amplifier. Thus, in the case of $R_{x1}=R_{x2}$, the output from the operational amplifier $2_1$ is the output voltage Vout itself which is not affected by the differential amplifier circuit $2_0$ and proportional to the weight of the load. Each of the switches $Sw_1$ and $Sw_2$ in this case may be a semiconductor switch or manual switch.

Figure 14:
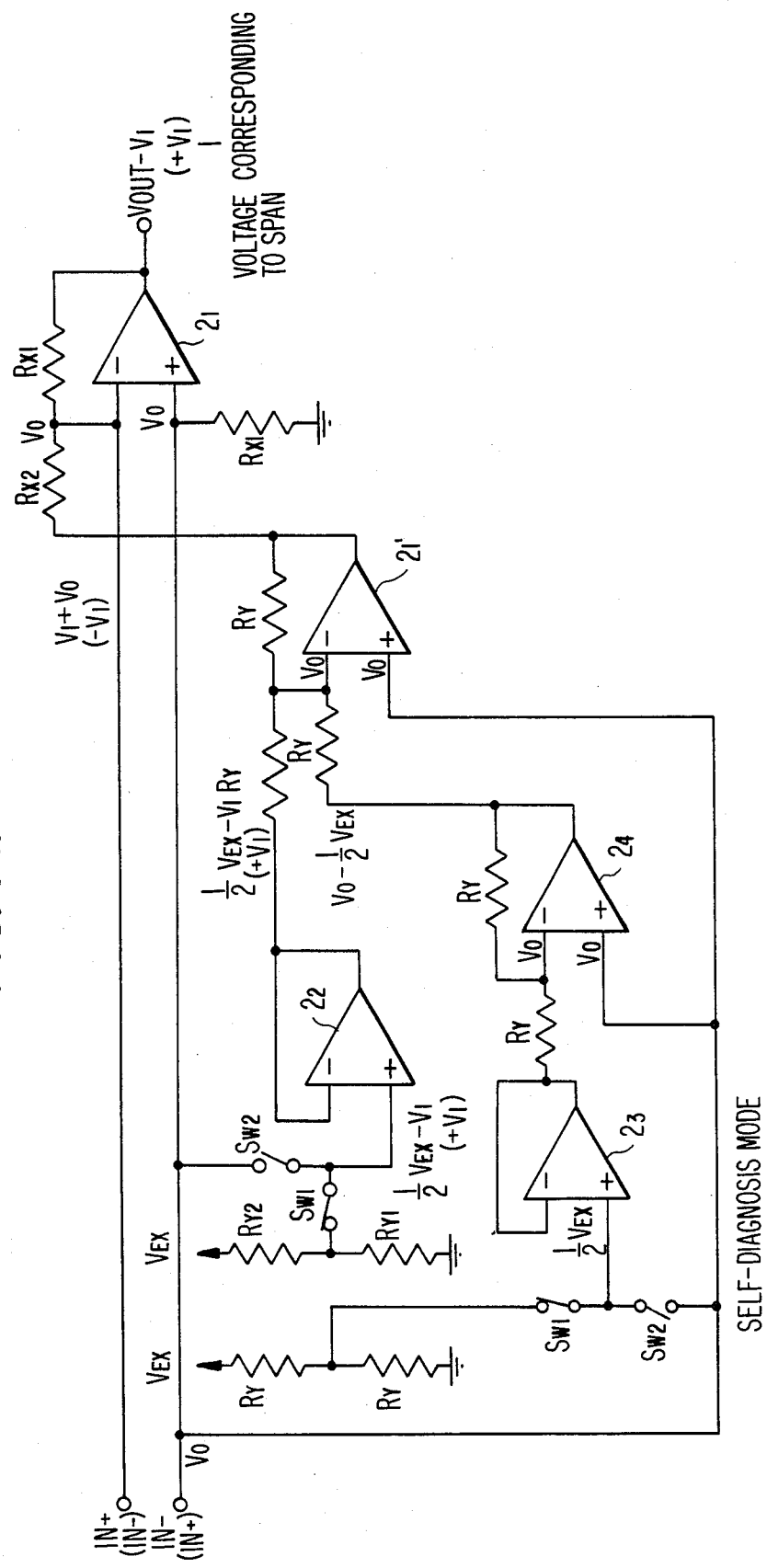

FIG. 14 is a circuit diagram of a weighing apparatus which is used in a self-dignosis mode, wherein, contrary to the weighing mode, the switches $Sw_2$ are turned off and the switches $Sw_1$ are turned on. Then, the voltage at the non-reversing input terminal of the operational amplifier $2_2$ becomes $\frac{1}{2}Vex-V_1$, where $V_1$ is a voltage corresponding to a span $\{\frac{1}{2}-R_{r1}/(R_{r1}+R_{r2})\}Vex$. The voltage at the non-reversing input terminal of the operational amplifier $2_3$ becomes $\frac{1}{2}Vex$. The voltage at each of the non-reversing input terminals of the operational amplifier $2_4$, the adding circuit $2_1'$ and the operational amplifier $2_1$ bvecomes $V_0$. As a result, the output voltage from the operational amplifier $2_4$ becomes $2V_0-\frac{1}{2}Vex$ and the output voltage from the operational amplifier $2_2$ becomes $\frac{1}{2}Vex-V_1$. Therefore, a cuurent addition determined by the following equation is executed at the negative input terminal of the adding circuit $2_1$. As a result, the adding circuit $2_1$ applies the output voltage ($V_1+V_0$) to the reversing input terminal of the operational amplifier $2_1$ through the resistor $R_{x2}$.

$$-[\{(\tfrac{1}{2} Vex - V_1) - V_0\} + \{(2 V_0 - \tfrac{1}{2} Vex) - V_0\}]/Ry = (V_1 + V_0)/Ry$$

Consequently, a current determined by the following equation flows at the negative input terminal of the operational amplifier $2_1$ in addition to the current proportional to the weight of the load on the load cell, with the result that a constant voltage $V_1$ corresponding to the span is added to the output voltage Vout proportional to the weight of the load and delivered from the operational amplifier $2_1$.

$$\{(V_1+V_0)-V_0\}/R_{x2}=V_1/R_{x2},$$

where $R_{x1}=R_{x2}$

Figure 15:
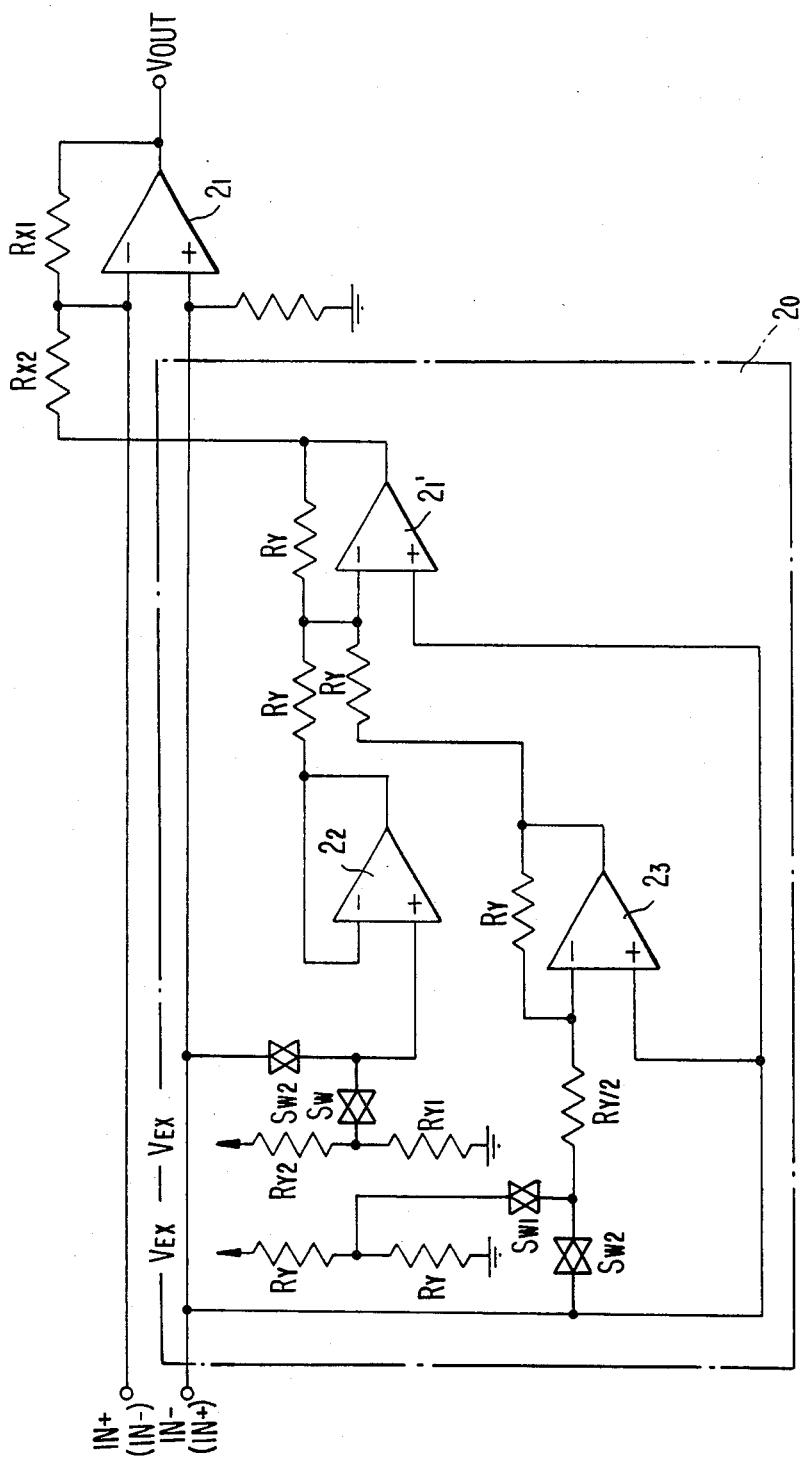
FIGS. 15 through 17 show circuit diagrams of a seventh embodiment of an electronic weigher according to the present invention.

FIG. 15 is a circuit diagram of a seventh embodiment of the present invention, wherein the configuration of the operational amplifier $2_3$ is different from that of the first embodiment.

Figure 16:
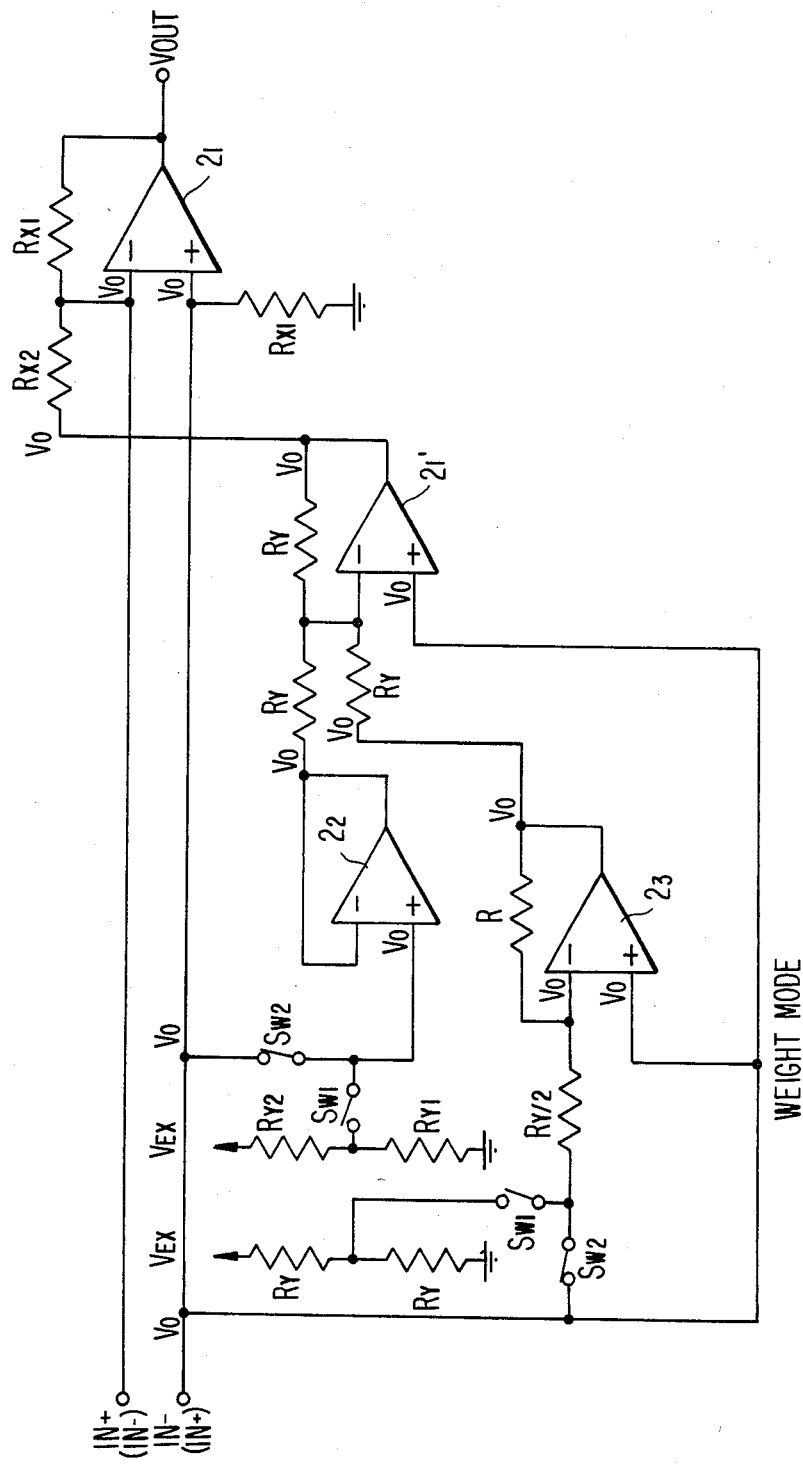

FIG. 16 is a circuit diagram of the seventh embodiment which operates in a weighing mode, wherein switches $Sw_2$ are turned on and switches $Sw_1$ are turned off as the embodiment shown in FIG. 13. Voltages at the respective portions at this time where $R_{x1}$ is equal to $R_{x2}$ are shown in the drawing.

Figure 17:
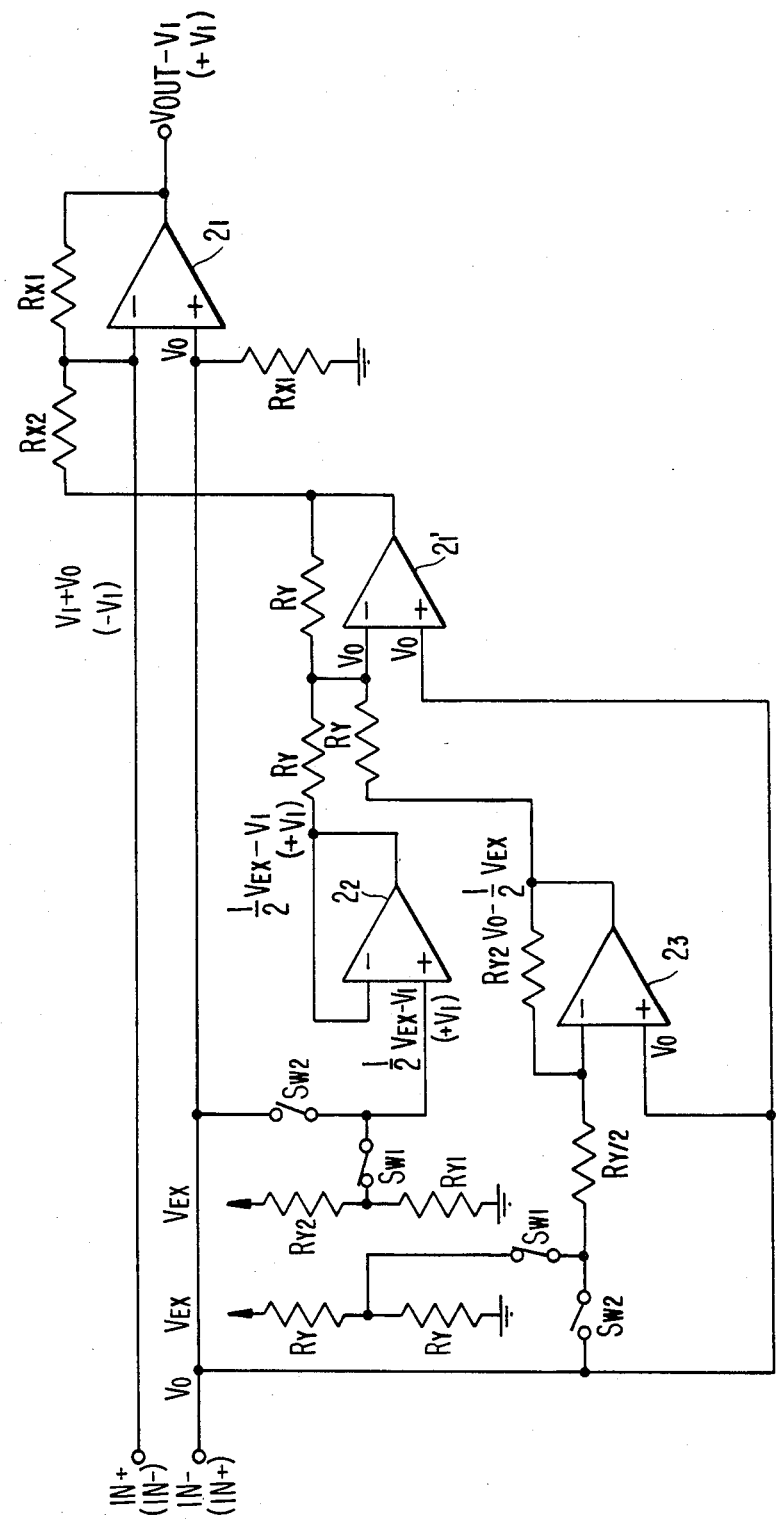

FIG. 17 is a circuit diagram of the seventh embodiment which operates in a self-diagnosis mode, wherein switches $Sw_2$ are turned off and switches $Sw_1$ are turned on as the embodiment shown in FIG. 14.

The sixth and seventh embodiments may employ operational amplifiers which are commercially available at a low price for the operational amplifiers $2_1$, $2_2$, $2_3$, $2_4$ thereby to form an integrated logic element together with the resistors $R_y$ of a resistor network.

Although cetain embodiments have been shown and described, it should be understood that many changes and modifications may be made therein without departing from the scope of the appended claims. For example, the manfuction indicating means 11 may be issue warning signals in voice and the bias circuit D may comprises an isolated stabilized voltage source and resistors.

What we claim is:

1. A electronic weigher, comprising:
    a load cell for producing an electric signal proportional to a load;
    a drift amount sensing circuit for sensing an amount of drift of the voltage at the output terminal of said load cell;
    an operational amplifier for amplifying the output signal from said load cell;
    a bias circuit for sensing a dummy signal for testing said operational amplifier during a self-diagnosis mode;
    switches for switching to the self-diagnosis mode; and
    correction means for correcting the dummy signal in accordance with the amount of drift sensed by said drift amount sensing circuit enabling said operational amplifier to produce a constant voltage at the output terminal thereof which is not affected by the output voltage produced by said load cell, when the self-diagnosis of the circuitry is executed by switching said switches.

2. An electronic weigher according to claim 1, wherein said switches comprise two pairs of switches for switching inputs to said drift amount sensing circuit and said correction means, a first pair of the switches being turned off and a second pair of the switches being turned on in a weighing mode and the first pair of the switches being turned on and the second pair of the switches being turned off in the self-diagnosis mode.

3. An electronic weigher according to claim 1, wherein the output voltage produced by said load cell is sensed at the output terminal of said operational amplifier when said first pair of the switches are turned off and said second pair of the switches are turned on, and sensed at the output terminal of said operational amplifier is the voltage obtained by adding the voltage at the output terminal of said load cell to a constant voltage when said first pair of the switches are turned on and the second pair of the switches are turned off.

4. An electronic weigher according to claim 1, wherein said drift amount sensing circuit is comprises two operational amplifiers and produces an output of $2A-B$, where A and B represent voltages at the output terminals of said load cell in a weighing mode and also represent divided voltages in a self-diagnosis mode, which are different from that in the weighing mode.

5. An electronic weigher according to claim 1, wherein said drift amount sensing circuit comprises a single operational amplifier and produces an output of $2A-B$, where A and B represent voltages at the output terminals of said load cell in a weighing mode and also represent divided voltages from different voltage sources in a self-diagnosis mode.

6. An electronic weigher according to claim 1, wherein said drift amount sensing circuit comprises two operational amplifiers, a primary operational amplifier functioning as a buffer circuit and a secondary operational amplifier producing an output of $2A-B$, where A and B represent voltages at the output terminals of said load cell in a weighing mode and also represent divided voltages from different voltage sources in a self-diagnosis mode.

7. An electronic weigher according to claim 1, wherein said switches are controlled by control means.

8. An electronic weigher according to claim 1, wherein the output produced by said drift amount sensing circuit is added to the output produced by said correction means.

9. An electronic weigher according to claim 1, further comprising means for determining whether the operational amplifiers are malfunctioning when the operational amplifiers produce an output which is in an unstable condition for a prescribed period of time.

10. A self-diagnosis circuit, comprising:
an arithmetic circuit for amplifying an electric signal proportional to a load;
switches for switching from a weighing mode to a self-diagnosis mode; and
a differential amplifier circuit for producing a signal equal to a voltage at a non-reversing input terminal of said arithmetic circuit when the weighing mode is selected and for producing a signal obtained by adding the reference voltage to a drift corrected constant voltage corresponding to a span in the self-diagnosis mode;
the output produced by said differential amplifier circuit being applied to said arithmetic circuit to produce a difference between the output produced by said differential amplifier circuit and the reference voltage.

* * * * *

UNITED STATES PATENT AND TRADEMARK OFFICE
CERTIFICATE OF CORRECTION

PATENT NO. : 4,722,406

DATED : February 2, 1988

INVENTOR(S) : Kazufumi Naito

It is certified that error appears in the above-identified patent and that said Letters Patent is hereby corrected as shown below:

Front page [57], line 10, "dumy" s/b --dummy--.

Col. 1, line 24, "erronous" s/b --erroneous--.

Col. 2, line 36, "erroreous" s/b --erroneous--.

Col. 2, lines 49-50, "elctronic" s/b --electronic--.

Col. 3, line 37, ";" s/b --.--;

Col. 3, line 66, "an" s/b --as--.

Col. 4, line 68, "amplfication" s/b --amplification--.

Col. 6, line 51, "microcomuter" s/b --microcomputer--.

Col. 9, line 56, "impedement" s/b --impediment--;

Col. 9, line 65, "since" s/b --Since--.

Col. 11, line 5, "decreases" s/b --decreased--.

UNITED STATES PATENT AND TRADEMARK OFFICE
CERTIFICATE OF CORRECTION

PATENT NO. : 4,722,406
DATED : February 2, 1988
INVENTOR(S) : Kazufumi Naito

It is certified that error appears in the above-identified patent and that said Letters Patent is hereby corrected as shown below:

Col. 12, line 27, "temerauter" s/b --temperature--.

Col. 14, line 8, "dirft" s/b --drift--;

Col. 14, line 15, "}" (first occurrence) s/b --{--;

Col. 14, line 53, "corrction" s/b --correction--;

Col. 14, line 55, "substabtially" s/b --substantially--.

Col. 15, line 49, "bvecomes" s/b --becomes--;

Col. 15, line 52, "cuurent" s/b --current--;

Col. 15, line 55, "2," s/b --2$_i$-- (both occurrences).

Col. 16, line 9, "configulation" s/b --configuration--;

Col. 16, line 27, "cetain" s/b --certain--;

Col. 16, line 31, "manfuction" s/b --malfunction--, and delete "be";

Col. 16, line 33, "comprises" s/b --comprise--.

Col. 17, line 8, delete "is".

Signed and Sealed this

Second Day of August, 1988

Attest:

DONALD J. QUIGG

Attesting Officer

Commissioner of Patents and Trademarks